United States Patent [19]
Smith et al.

[11] Patent Number: 6,052,669
[45] Date of Patent: Apr. 18, 2000

[54] GRAPHICAL USER INTERFACE SUPPORTING METHOD AND SYSTEM FOR REMOTE ORDER GENERATION OF FURNITURE PRODUCTS

[75] Inventors: Ward W. Smith, Lansing; John M. Ellis, Holland; Michael P. McNutt, Grand Rapids; Renee E. Schoeppe, Wyoming, all of Mich.

[73] Assignee: Haworth, Inc., Holland, Mich.

[21] Appl. No.: 08/870,681

[22] Filed: Jun. 6, 1997

[51] Int. Cl.[7] .................................................. G06F 17/60
[52] U.S. Cl. ......................... 705/26; 395/500.01; 705/27
[58] Field of Search ................................ 705/1, 7, 8, 26, 705/27, 400; 706/46; 346/326, 339, 433, 418; 364/488, 512; 395/500, 500.01

[56] References Cited

U.S. PATENT DOCUMENTS

| | | | |
|---|---|---|---|
| 4,642,780 | 2/1987 | Thomson | 364/512 |
| 4,700,317 | 10/1987 | Watanabe et al. | 706/45 |
| 4,829,446 | 5/1989 | Draney | 364/488 |
| 5,111,392 | 5/1992 | Malin | 705/29 |
| 5,293,479 | 3/1994 | Quintero et al. | 345/353 |
| 5,369,732 | 11/1994 | Lynch et al. | 706/46 |
| 5,515,524 | 5/1996 | Lynch et al. | 395/500 |

OTHER PUBLICATIONS

International Search Report, PCT/US98/09890, dated Aug. 20, 1998.

*Primary Examiner*—Stephen R. Tkacs
*Attorney, Agent, or Firm*—IP Group of Pillsbury Madison & Sutro LLP

[57] ABSTRACT

A graphical user interface to a method and system for configuring office furniture includes interface objects for obtaining configuration criteria from a user; presenting the user with at least one typical configuration satisfying the criteria; selecting a typical configuration from the at least one typical configuration; modifying aspects of the selected typical configuration to produce a modified configuration; and checking the validity of the modified configuration. The configuration criteria include conferencing criteria; privacy criteria; power criteria; communications criteria; storage criteria; and area criteria. A typical can be modified by adding, deleting, or repositioning a component, changing the fabric or finish or the shape or size of the component. A cluster configuration based on the typical configuration is formed. The entire product line can be changed. At any time the entire typical or cluster configuration can be checked for validity and priced.

41 Claims, 15 Drawing Sheets

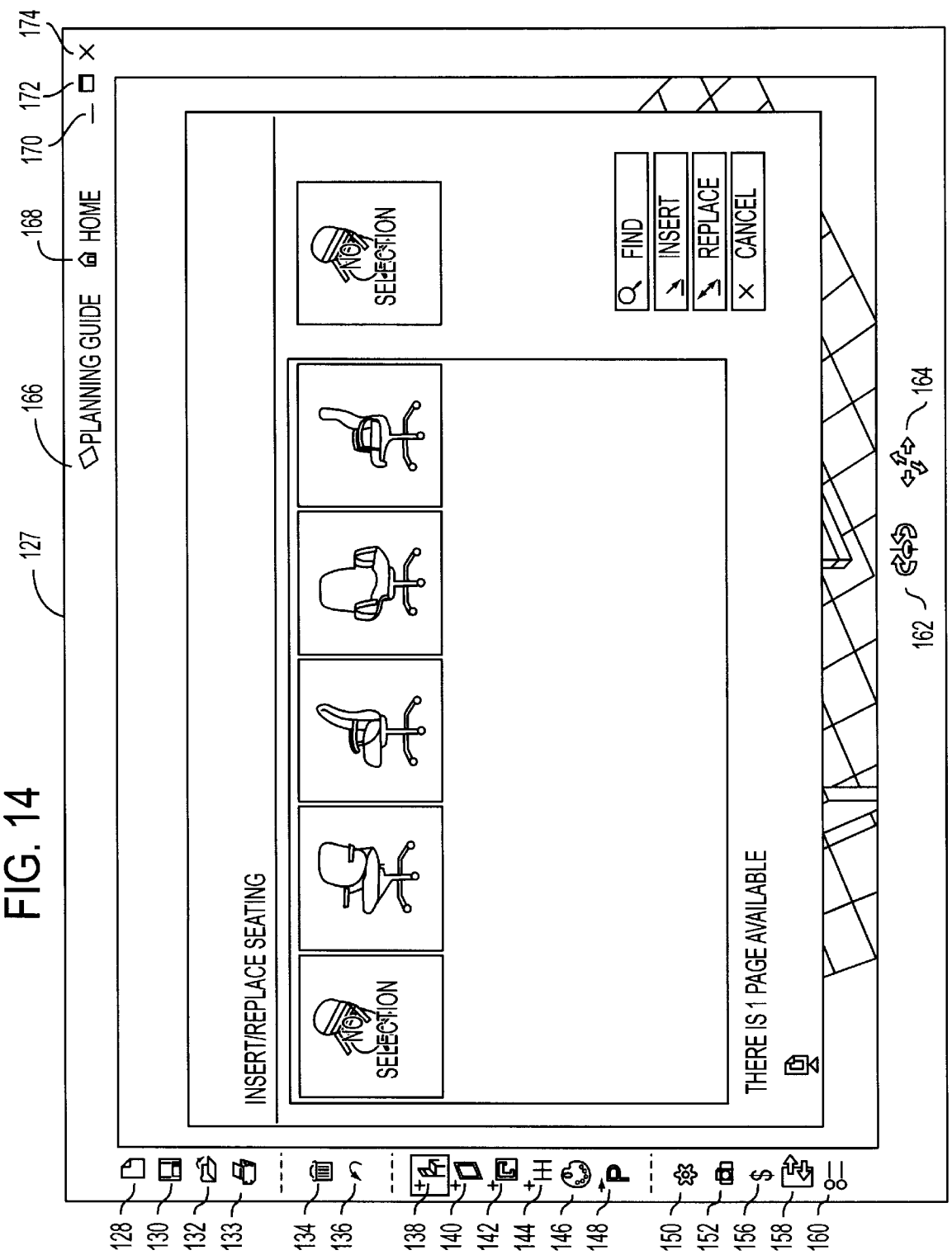

FIG. 15

| COMPONENT | SIZE | QTY | BASE PART NU... | LIST | DISC. | EXT. $ | DEALER% | COST | MARGIN$ | MARG% |
|---|---|---|---|---|---|---|---|---|---|---|
| CURRENT PROJECT | | | | | | | | | | |
| PANEL | 64x24 | 3 | NPFW-6424-P.F... | $508.00 | 0% | $1524.00 | 40% | $609.60 | $914.40 | 250% |
| PANEL | 64x36 | 2 | NPFW-6436-P.F... | $611.00 | 0% | $1222.00 | 40% | $488.80 | $733.20 | 250% |
| PANEL | 64x48 | 2 | NPFW-6448-P.F... | $702.00 | 0% | $1404.00 | 40% | $561.60 | $842.40 | 250% |
| FJ-OAH | | | FJ-OAH | | | | | | | |
| FE-0C7 | | | FE-0C7 | | | | | | | |
| TR-00E | | | TR-00E | | | | | | | |
| VP-00N | | | VP-00N | | | | | | | |
| BRACKET | 0 | 4 | NSC-1,TR-00K | $37.00 | 0% | $148.00 | 40% | $59.20 | $88.80 | 250% |
| BRACKET | 0 | 2 | NUDS-15,TR-00R | $37.00 | 0% | $74.00 | 40% | $29.60 | $44.40 | 250% |
| BRACKET | 0 | 1 | NUSS-10,TR-00R | $37.00 | 0% | $37.00 | 40% | $14.80 | $22.20 | 250% |
| CONNECTOR | 64 | 3 | NV2W-64-F,TR-... | $161.00 | 0% | $483.00 | 40% | $193.20 | $289.80 | 250% |
| COVER | 64 | 2 | NVEW-64-F,TR-... | $82.00 | 0% | $164.00 | 40% | $65.60 | $98.40 | 250% |
| CONNECTOR | 64 | 3 | NVSS-64 | $35.00 | 0% | $105.00 | 40% | $42.00 | $63.00 | 250% |
| WORK SURFACE | 24x48 | 1 | NWRW-2448,VP... | $452.00 | 0% | $452.00 | 40% | $180.80 | $271.20 | 250% |
| VP-00N | | | VP-00N | | | | | | | |
| WORK SURFACE | 24x72 | 1 | NWRW-2472,VP | $576.00 | 0% | $576.00 | 40% | $230.40 | $345.60 | 250% |

TOTALS
DEALER COST  % 40  $2,475.60
DEALER MARGIN  0  $2,475.60

OVERALL DISCOUNT:
● PERCENTAGE  ○ TIERED
2 %

☑ VIEW ENHANCED ANALYSIS  0.000000  % DISCOUNT

QUOTE TOTAL  $0.00

● HEADER  ✓ OK  ✗ CANCEL

GRAPHICAL USER INTERFACE SUPPORTING METHOD AND SYSTEM FOR REMOTE ORDER GENERATION OF FURNITURE PRODUCTS

BACKGROUND OF THE INVENTION

1. Reservation of Copyright

The disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyrights whatsoever.

2. Field of Invention

This invention relates to graphical user interface supporting a method and system for enabling the selection and configuration of complex furniture products. More specifically, this invention relates to enabling the selection and configuration of three-dimensional office furnishing products so as to enable remote order generation of valid and acceptable configurations of those products.

3. Description of Background Information

The sale process for complex products, that is, products that are made up of many interconnected parts, is notoriously difficult, especially when customers are given configuration and product-line choices.

For example, in the office furniture industry, the goal of the sale process is to provide the customer with an acceptable furniture configuration within the customer's price limitations.

From the customer's perspective, an acceptable configuration is one which will provide workspace for their employees within various work-related and space criteria set by the customer. For example, a customer may need to provide, in a given area, sitting work space for a thousand people, where all people have acoustic privacy. A customer's criteria may be complex and often the customer does not really know what they are, other than to know the number of people and the space they will go into.

From the manufacturer's perspective, an acceptable configuration is one which can be manufactured from the manufacturer's product line. That is, an acceptable configuration is a valid, manufacturable configuration of existing component parts.

The sales process is essentially an attempt to reach a convergence on a configuration which is acceptable to the customer (meets all space, price and other requirements) and which is acceptable to the manufacturer (is a valid configuration which is manufacturable).

An office workspace configuration may comprise thousands of parts drawn from an inventory of millions of possible parts. Each workspace may comprise dividing walls or side panels, work surfaces, storage areas, support structure, electrical structure and the like. Even for a given configuration of workspace, there are various qualitative and quantitative options available. Each part may be available in various qualities and in various colors. Some of the parts may not be compatible with parts from other product lines of the same or other manufacturers. Further, any choice made, even for a single part, may affect the entire configuration.

A customer wishing to buy a complex product such as office furniture is faced with an incredible number of inter-dependent choices.

In the office furniture market at present, a typical sale takes place as follows: A salesperson visits a customer and presents the customer with drawings of some typical configurations of various product lines. The customer selects various options which the salesperson records. At this time all of the sale is taking place in terms of individual parts and not in terms of the final product or even in terms of compound components of the final product. In other words, the customer does not buy a collection of workstations, instead he buys a collection of parts.

Once the customer is satisfied with the configuration, the salesperson goes back to the manufacturer who determines whether or not the configuration is actually possible given the current product line. For example, the customer may have put a shelf on a dividing panel without confirming that the panel could actually support such a shelf. Or a panel may be given a size which the manufacturer does not or cannot manufacture. Accordingly, the manufacturer then tries to build the customer's proposed order using a CAD (computer aided design) system and a collection of known parts. Errors in the customer's proposed order are reported and, in some cases, a best attempt at the order is drawn up. From this best attempt produced by the CAD operators, a list of required component parts is obtained and then a price for the entire configuration is determined for all of the component parts.

This process, so far, can take more than two weeks. The sales person then goes back to the customer with the design, as best it could be done, and the price for this design. This is the first time that the customer sees his actual order drawn out, and usually in two-dimensions. If there were errors in the design, which there usually are, or if the customer does not like the current design, the process is repeated.

After some number of iterations (that is customer to sales person to CAD operator to pricing and back to the customer via the sales person), the customer is finally presented with an acceptable configuration and a price for that configuration.

In a typical sales scenario this whole order process (i.e., convergence to a configuration which is acceptable to both the customer and the manufacturer) takes six sales calls and design iterations.

Even when the customer is satisfied with a configuration and even if it is a valid, manufacturable configuration, there is no simple way for anyone to go back and ask a simple "what if" type of question about the order. For instance, if, in an order for an acceptable configuration, the customer wants to know the effect on price of changing to a different quality panel system, the whole price would have to be redetermined by the manufacturer.

To see why this pricing and configuration process is not simple, consider the change from a high quality panel to a lower quality panel of the otherwise same dimensions. Suppose that the panel has a shelf hanging on it and that the high quality panel can support shelves whereas the lower quality panel cannot support shelves without an extra support. So, a supposedly simple question like "What if I use this type of panel instead of that?" can lead to an entire reconfiguration and repricing of the system. Its often not enough to just change the price of the components being used, sometimes the components themselves have to be supplemented. In some cases, changes may not be possible.

Even from a salesperson's perspective, the inability to price "what if" scenarios has major drawbacks. For instance, if a customer is satisfied with a configuration's layout but still thinks that the price is too high, it is desirable for the salesperson to be able to make qualitative changes to the configuration and show what the corresponding price changes would be. In the case of office furnishings, a salesperson would like to be able to show, at the customer's site and at the time of setting up the configuration, the effects on price of various changes. In that way, convergence to an acceptable configuration can be achieved with greater speed.

In the general field of product configuration, tools have been developed to aid in selection and validation of configurations. One such system is available from Trilogy Development Group of Austin, Tex., and is described in U.S. Pat. No. 5,515,524, "Method and Apparatus for Configuring Systems," to Lynch et al, which is expressly incorporated herein by reference in its entirety.

Lynch describes a constraint based configuration system using a structural model hierarchy. The structural aspects of the model provide the system with the ability to define a model element as being contained in, or by, another model element. The structural model provides the ability to identify logical datatype and physical interconnections between elements and to establish connections between elements.

In order to configure a product, Lynch's system accepts input in the form of requests or needs. Using this information, Lynch's system configures a system by identifying the resource and component needs, constraints imposed on or by the resources or components identified, and the structural aspects of the system.

In the specific area of office furniture configuration, attempts have been made to provide customers with simple CAD systems with which to design their configurations. The problems with these systems include that they are difficult to use, they are inaccurate, they do not provide the customer with a way to determine whether or not he has a valid, manufacturable configuration (so the customer still has to go back to the manufacturer to have configurations manually checked), and they do not have any knowledge of the manufacturer's product line. Further, no proposed systems are able to prepare a configuration and provide a price for that configuration.

SUMMARY OF THE INVENTION

It is an object of this invention to provide an order generation system, preferably a remote order generation system.

It is a further object of this invention to provide sales people and customers with product configuration systems that are easy to use, accurate, provide the customer with some way to determine whether or not he has a valid, manufacturable configuration (so that the customer does not have to go back to the manufacturer to have configurations checked each time they change), and that has knowledge of the manufacturer's product line. It is a further object of this invention to provide a system that is able to prepare a configuration and that is also able to provide a price for that configuration.

It is also an object of this invention to provide a system that can have product line and price information added and modified.

It is also an object of this invention to provide a system that generates visual specification in two-dimensional (2-D) and three-dimensional (3-D) rendered images.

Accordingly, in one aspect, this invention provides a graphical user interface to a computer program for configuring and ordering office furniture. The user interface presents a user with various selectable options, via display screens on a monitor. Depending upon which options the user selects, the graphical user interface provides the user with information about the product selected or gets input from the user about his requirements.

The user can interact with the order generation program via the user interface to select a basic configuration of furniture, modify the configuration, create a cluster derived from the basic configuration. At all times the user is able to ensure that the current configuration is valid (i.e., manufacturable and/or within the product line) and the user is able to obtain price information about the configuration.

The system takes as input user criteria such as conferencing criteria; privacy criteria; power criteria; communications criteria; storage criteria; and area criteria.

The user, via the user interface, can modify a configuration by adding, deleting or moving components in the configuration or by changing the size or shape of a component of the configuration. When the shape or size of a component is adjusted, it can only be changed to a valid shape or size, thereby maintaining the integrity of the displayed furniture configuration.

Generally, at any stage of the furniture configuration, the user is able to obtain a realistic display of the configuration and is then able to view that display from arbitrary view points.

Thus, in one aspect, this invention is a graphical user interface, a method for using the graphical user interface, or a method of configuring office furniture. In another aspect, this invention is computer-readable media tangibly embodying an interface program of instructions executable by the machine to provide a graphical user interface to a computer program for configuring office furniture.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein:

FIGS. 5–15 depict various interface displays of the order generator of the present invention during its operation.

DETAILED DESCRIPTION OF THE PRESENTLY PREFERRED EXEMPLARY EMBODIMENTS

Figure 1:
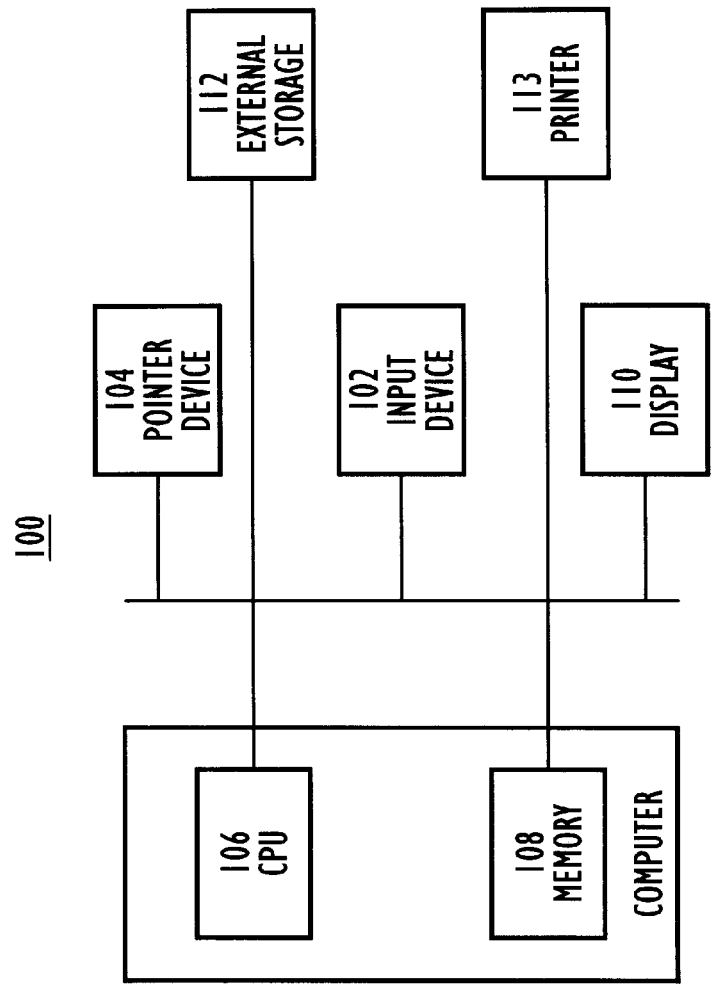
FIG. 1 depicts a typical computer system on which the order generator of this invention operates.

This invention operates on a typical computer system 100 such as shown in FIG. 1. The computer system 100 includes various input devices 102 such as a keyboard, as well as a pointer device 104. A mouse, track ball, touch screen, keyboard cursor control keys or the like can be employed as the pointer device 104. The computer system 100 also includes a processor such as CPU 106 and internal memory 108. The processor 106 may be a special purpose processor with image processing capabilities or it may be a general purpose processor. The memory 108 may comprise various types of memory, including RAM, ROM, and the like. The computer system 100 also includes external storage 112 which includes devices such as disks, CD ROMs, ASICs, external RAM, external ROM and the like.

The present invention can be implemented as part of the processor 106 or as a program residing in memory 108 (and external storage 112) and running on processor 106, or as a combination of program and specialized hardware. When in memory 108 and/or external storage 112, the program can be in a RAM, a ROM, an internal or external disk, a CD ROM, an ASIC or the like. In general, when implemented as a program or in part as a program, the program can be encoded on any computer-readable medium or combination of computer-readable media, including but not limited to a RAM, a ROM, a disk, an ASIC, a PROM and the like.

The computer system 100 also includes a display 110 and, optionally, an output device such as a printer 113.

The computer system 100 can run any operating system.

In preferred embodiments, the computer system 100 is an IBM PC compatible notebook computer configured with a Pentium 90 (or above) CPU (for processor 106) and, (for memory 108) a minimum of sixteen Mbytes RAM, a CD drive and a hard drive with 840 Mbytes, with approximately thirty Mbytes of free disk space (for external storage 112). The computer system 100 preferably runs Microsoft Windows 95 as its operating system.

The preferred display 110 is an 800×600 active color matrix display with sixteen-bit color. The preferred printer 112 is at least an ink jet color printer.

While the preferred computer system is a stand-alone system, in other embodiments the computer system 100 is connectable to a network of computers so that some or all of its processing functions, for example, for complex tasks, can be off loaded to other computers on the network. In network environments some or all of the data may reside at remote locations.

Figure 2:
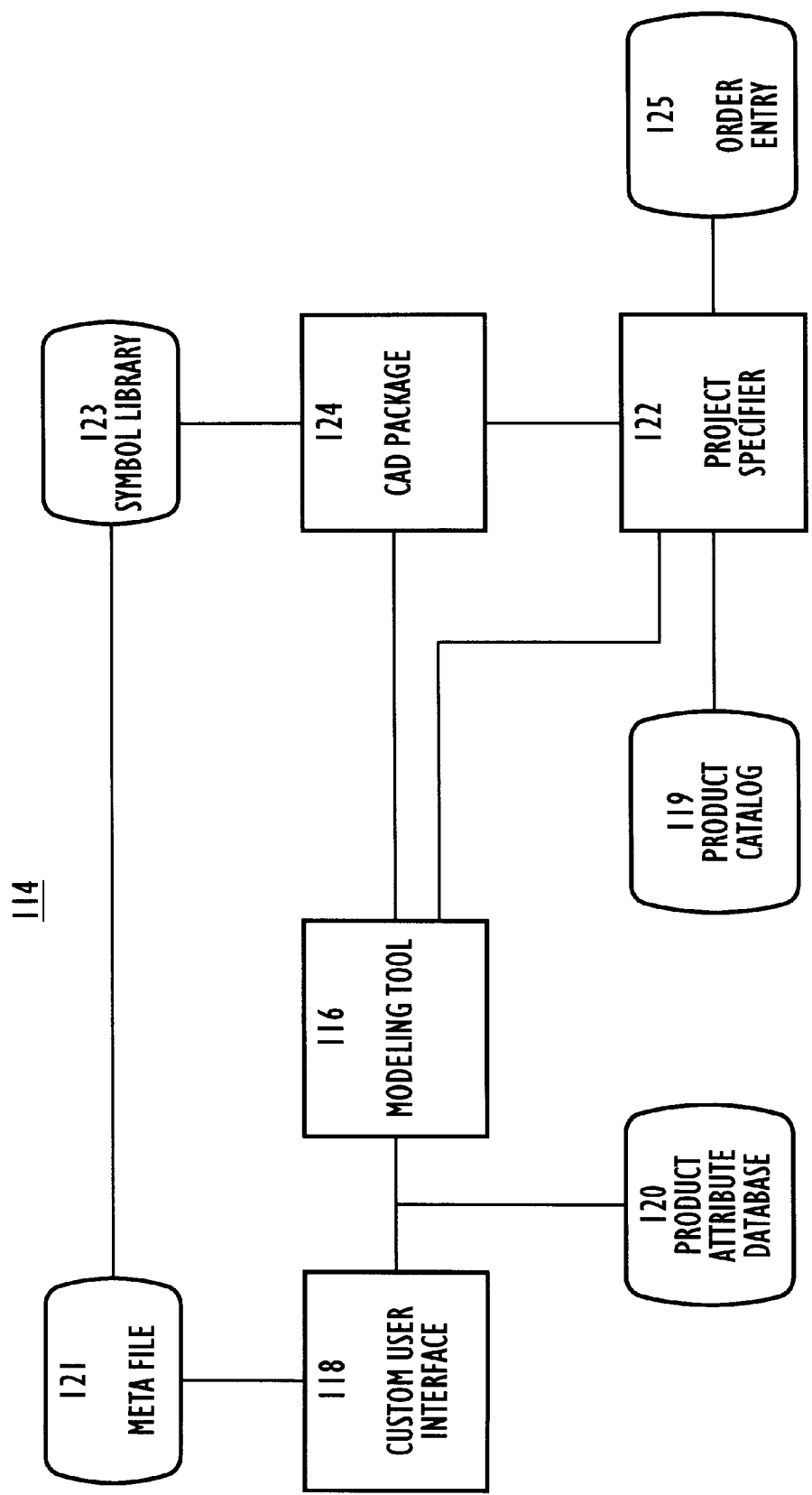
FIG. 2 shows the architecture of a preferred embodiment of the order generator according to this invention.

The architecture of a preferred embodiment of the order generator is shown in FIG. 2 wherein the order generator 114 uses a modelling tool 116 connected to a custom user interface 118. Both the modelling tool 116 and the custom user interface 118 access (read and/or write) various databases, including a product attribute database 120. The user interface 118 also accesses a meta file 121 which it uses to share data through a symbol library 123 with a CAD package 124.

The modelling tool 116 takes as input various user configuration specifications via the custom user interface 118, verifies their validity and determines their pricing. This information can be passed back to the custom user interface 118 or it can be used by a project specifier 122, in conjunction with the CAD package 124, to produce an actual order 125. The project specifier 122 also takes input from a product catalog 129 in order to produce the actual order 125.

In one aspect, the custom user interface 118 operates as a front-end to the modelling tool 116, providing it with user requirements, user specified furniture configurations and other information and obtaining from it configuration information including whether or not a configuration is valid and the price of the configuration.

Preferably the modelling tool 116 is one which uses a generative approach for configuring systems. Such a system is available from Trilogy Development Group of Austin, Tex., and is described in U.S. Pat. No. 5,515,524, "Method and Apparatus for Configuring Systems," to Lynch et al, already incorporated by reference herein in its entirety.

Lynch's system, in order to configure a product, accepts input in the form of requests or needs. Using this information, Lynch's system configures a system by identifying the resource and component needs, constraints imposed on or by the resources or components identified, and the structural aspects of the system.

Thus, in the present invention, the modelling tool 116 is programmed to configure office furniture systems by identifying the component needs, resources, and constraints imposed on or by the resources or components identified, and the structural aspects of the system. For example, a particular storage requirement may require a certain type of panel. If a user requires that type of storage then the appropriate type of panel must be used.

The model can handle both configuration and checking functions. In the preferred embodiment, three-dimensional objects and their topological relationships are modelled. The attributes modeled include, but are not limited to:

size (x, y, z dimensions);

color;

texture;

finish (fabric/direction, wood/direction, laminate, glass, metal);

obsolescence;

power (electric); and weight.

The modelling system 116 can connect workstations, recognize and fix common walls, resolve component duplication and overlap, indicate obstacles and resolve power connectivity. For example, with regard to panel connectivity, angles are confined to a limited number of fixed positions. As to common walls, from a two-dimensional representation of a layout, the system ensures that the correct number of parts is calculated.

The modelling system 116 bases its determinations on the input user requirements and on information in the product attribute database. It also uses a model of the interrelationships between the various components. An example of such a model is shown in the tables appearing at the end of this specification.

Figure 3:
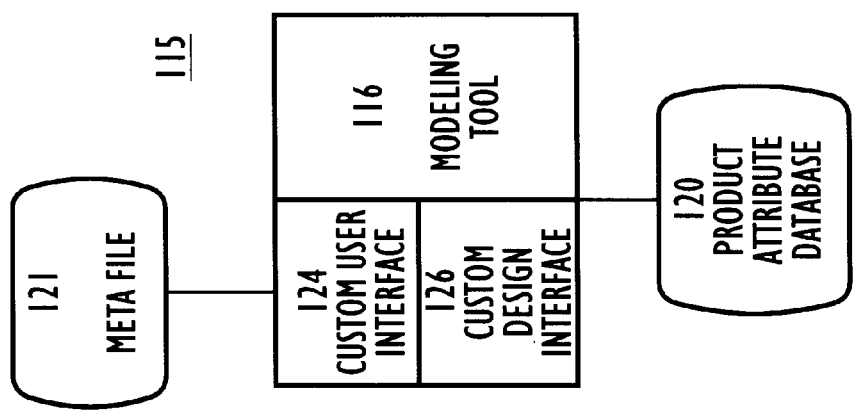
FIG. 3 shows the architecture of an alternative preferred embodiment of the order generator according to this invention.

In an alternate embodiment of the order generation system 115, as shown in FIG. 3, the functions of the project specifier are incorporated into the modelling tool 116 and there is tight coupling of the modelling tool to a CAD program. In this embodiment of the order generation system 115, there are two integrated interfaces to the modelling tool 116, namely a custom user interface 124 and a custom design interface 126.

System Operation

The operation of the order generation system 114, particularly the custom user interface 118, on computer system 100 is now described with reference to FIGS. 1–15. The custom user interface 124 of the alternative embodiment 115 shown in FIG. 3 operates in the same manner.

Figure 4:
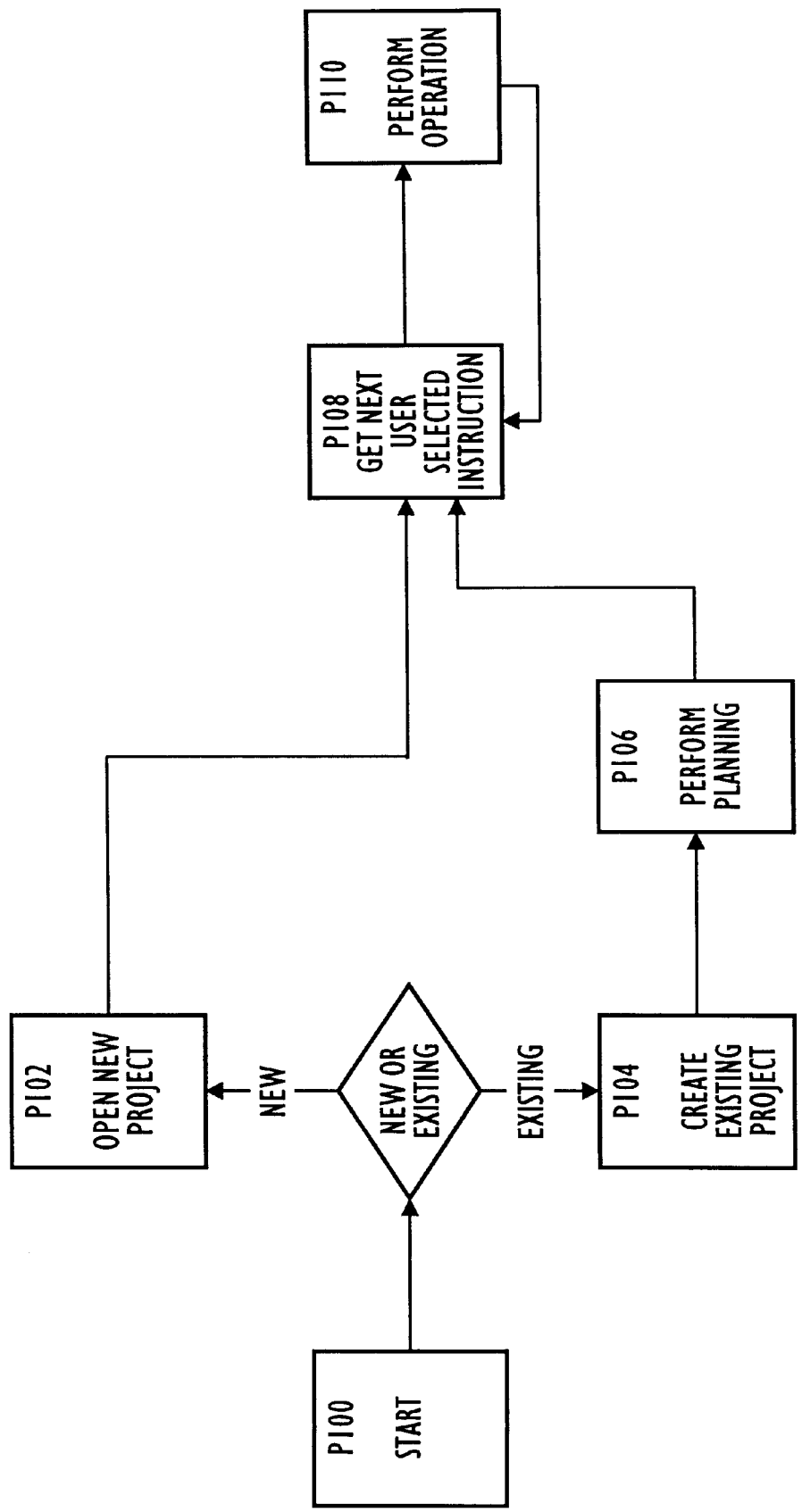
FIG. 4 is a flowchart of the operation, from a user's perspective, of the order generator of the present invention.

When the order generation system 114 begins running on computer system 100, the user is presented with a start screen on the display 110 of computer system 100 (at P100 in FIG. 4). The start screen presents the user with various user selectable options. The options are presented as demarcated text areas or as icons on the screen depicted on the display 110 of the computer system 100. Each presented option can be selected with the pointer device 104 or using one or more keys on the keyboard 102. An option is selected in a known manner such as by clicking the pointer device 104 on the area of the screen on which the option is displayed.

When an option is selected, the custom user interface 118, running on computer system 100, determines which option has been selected and then either processes the option or effects processing of that option. For example, some options are processed entirely within the user interface 118 itself, whereas others require processing by other components of the system 114, in particular by the modelling tool 116.

Generally the custom user interface 118 keeps track of user information at a project level. For each project the custom user interface 118 gets information from the user and then tracks and stores that information as needed. The information is tracked and stored in a manner known in the art such as in a data structure or database which can be accessed as needed. When the user interface 118 requires information regarding product attributes, it obtains that information from the product attribute database 120. When, as the result of some implicit or explicit user request, the user interface 118 requires some processing to be performed by the modelling tool 116, the user interface 118 invokes the appropriate functionality of the modelling tool 116 and gives the modelling tool 116 whatever data is needed. For example, if, as will be described below, the user requests, via the user interface 118, that the modelling tool 116 check the validity of a furniture configuration, then the user interface 118 will pass to the modelling tool 116 the appropriate data representing the current configuration. Using the data it receives about the configuration from the user interface 118, along with whatever information it needs from the product attribute database 120, along with the model of the system, the modelling system will then, as requested, check the configuration of the configuration. The result of the configuration check by the modelling tool 116 is not simply a binary "valid" or "invalid" result, but, when possible, is a valid configuration. Thus, the modelling tool 116 is able to pass back configuration data to the user interface 118.

From the start screen presented to the user by the user interface 118, the user is given the option of either loading an existing project (i.e., a project which was previously saved by the order generation system 114) (at P102), or beginning a new project (at P104). If the user selects the option to open an existing project, then the order generation system 114, via the user interface 118, prompts the user for the name under which that project was saved. If the named project can be found, the order generation system 114 retrieves the project and loads it into the system, otherwise the user is prompted for another project name or to start a new project.

If the user selects the option to create a new project (at P104), then the user is prompted (at P106) to input the needs of the project on a series of planning guide screens. Based on the user's input into the planning guide screens, the order generation system 114 determines which options to present to the user in subsequent display screens.

For example, the user interface 118 compiles or translates the entered user requirements into criteria which both it and the modelling tool 116 can use. Then, when requesting a list of components which meet the user's needs, the user interface and, when necessary, the modelling tool 116, can query the requirements to ensure that they are met.

One example of such a use would be if the user's needs included standing privacy and lockable storage space. Then, as described below, when the user requested a list of typical configurations satisfying his needs, those which did not provide standing privacy and lockable storage would be excluded.

The various planning requirements (user needs) for which the user is prompted include, but are not limited to, privacy requirements, storage requirements, conferencing criteria, electrical/computer space and connection requirements, space requirements, budget constraints, lighting requirements and types of use.

Figure 5:
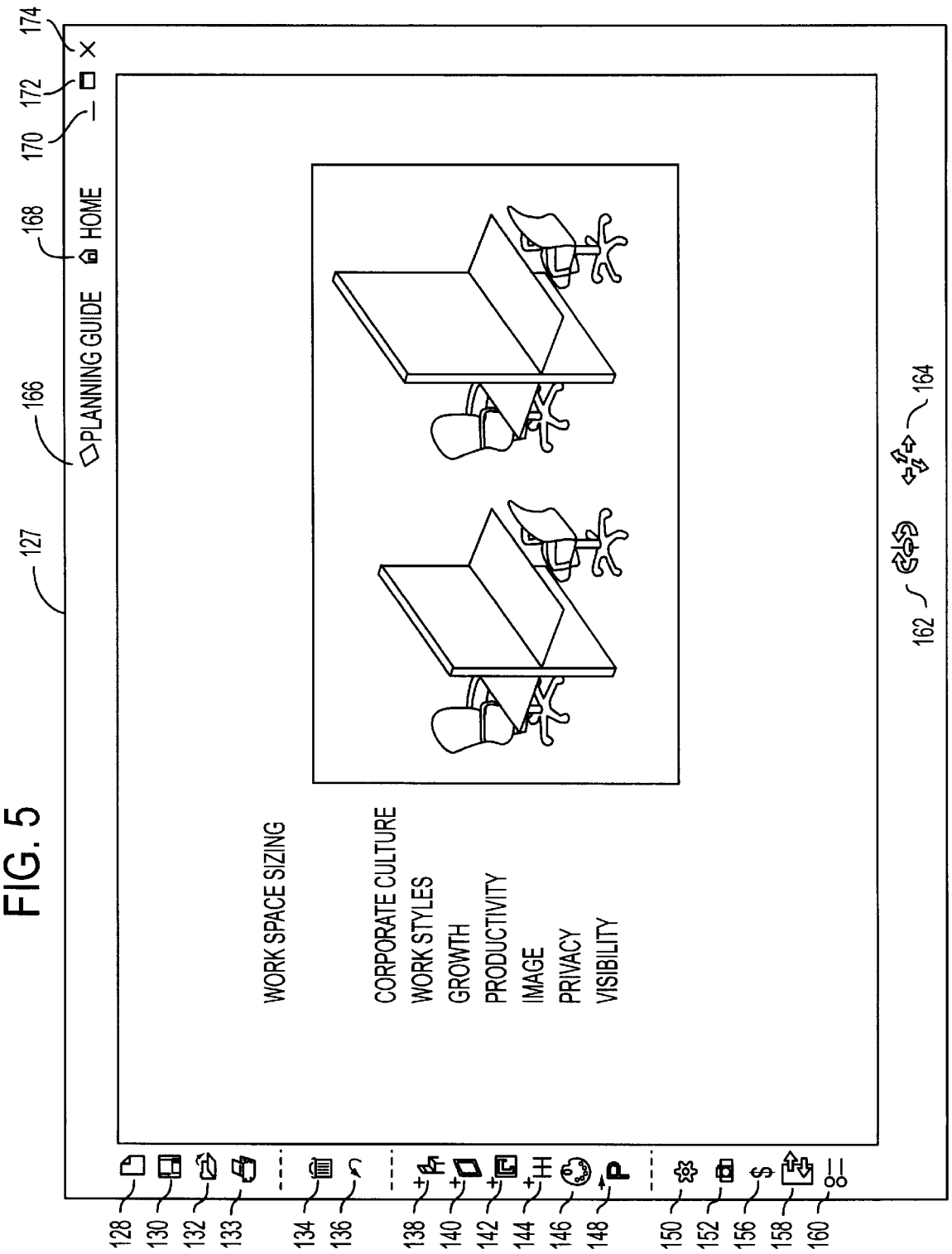

As to privacy options, the user is given the option of specifying the privacy requirements in terms of panel heights or in terms of various types of privacy: "seating privacy", "standing privacy", "acoustic privacy" and the like. If the user selects certain types of privacy, the order generation system 114 translates this selection into a panel height selection. In preferred embodiments the user is presented with images such as shown in FIG. 5 in order to explain the various privacy options.

Figure 6:
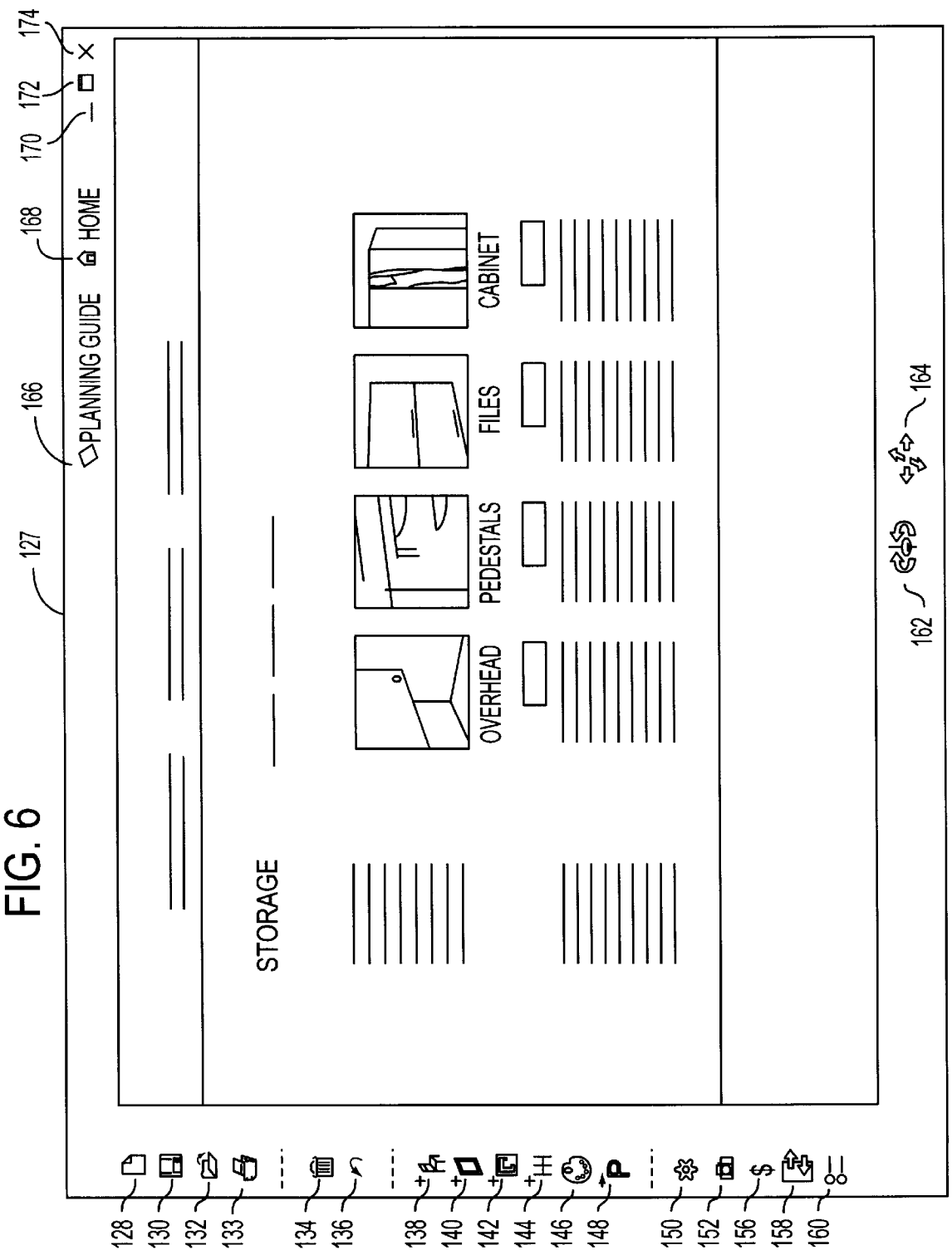

Preferably the planning guide consists of a series of forms which are graphically displayed on the screen, each form having a number of options. Once the user selects a particular option, a screen for that option is displayed with questions about the various sub-options. For example, in order to determine the user's storage requirements, the user selects a storage requirements option and is presented with a storage requirements screen. As shown in FIG. 6, this screen includes pictures of various types of storage along with textual descriptions of the items which can be stored in each kind of storage.

In some embodiments the user is also provided with an optional tour through a virtual showroom. This tour would consist of a multimedia (e.g., Quicktime etc.) tour through a showroom demonstrating the various product lines available and various configurations of those products.

Once the user has completed the planning (at P106) or opens an existing project (at P102) the order generation system 114 provides the user with various options described below. In general, navigation in the order generation system 114 is non-modal. That is, any display screen can be reached from any other display screen and user selected instructions or operations (at P108) are performed (at P110), in effect, either by the user interface 118 or by some other part of the order generation system 114 such as the modelling tool 116. Generally, when a user selects an instruction, the order generation system 114 running on computer system 100 performs that instruction. Preferably the user interface 118 performs as many functions as it can, passing requests to the modelling tool 116 only as needed.

Figure 7:
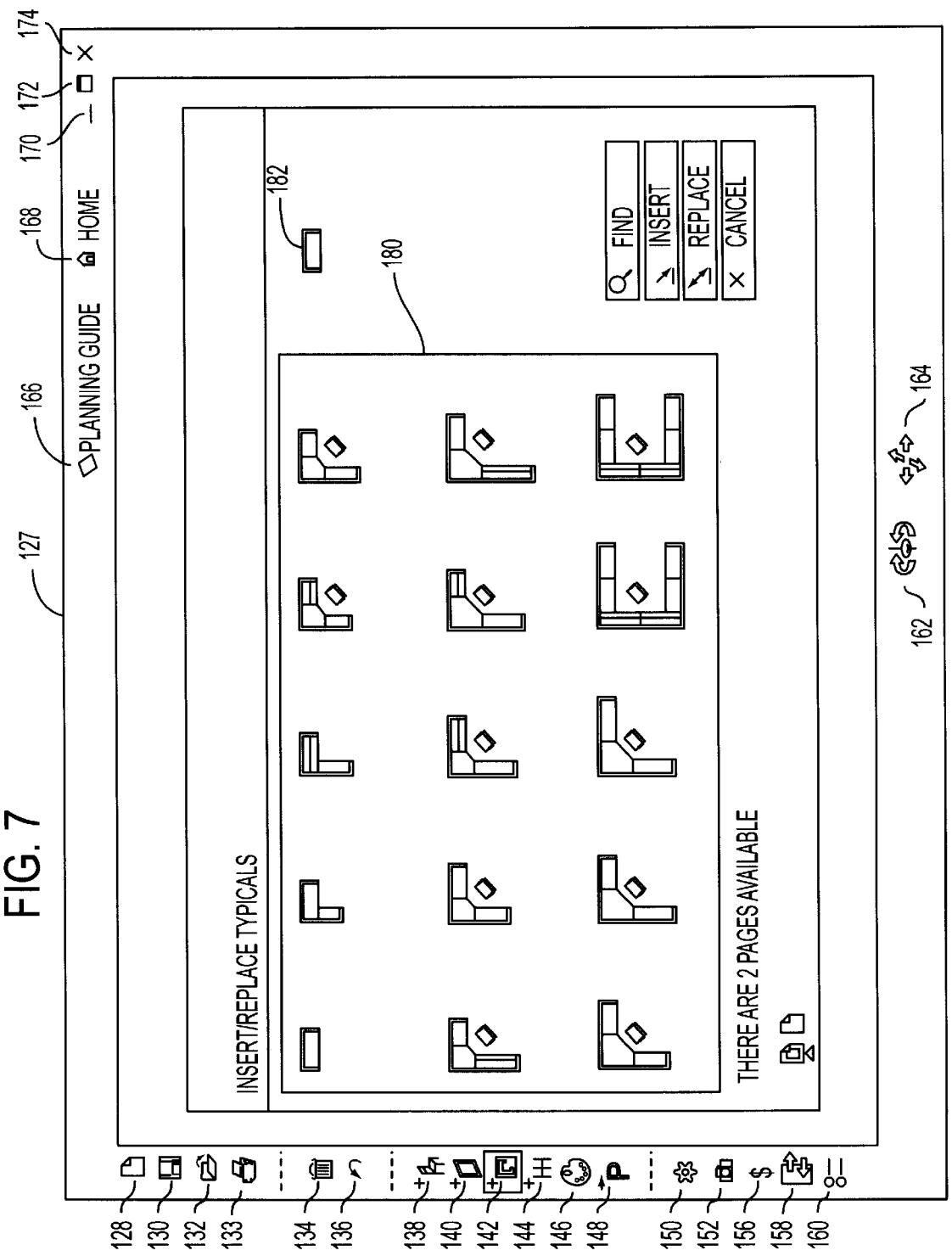

Thus, as shown in FIG. 7, each display screen 127 includes various user selectable icons (128–174). Preferably, the icons (128–174) are grouped and positioned on the screen 124 according to their type of functionality. For example, icons 128–133 relate to project maintenance (saving and restoring) and printing functions; icons 134 and 136 relate to editing functions; icons 138–160 relate to configuration and customization functions; icons 162 and 164 relate to image positioning and moving functions; planning guide icon 166 relates to the planning guide functionality (described above) and the home icon 168 returns the user to the start (or home) display screen. The window control icons 170–174 are used to size and position the display screen 126 on the display 110.

When the user selects (by clicking on it with the pointer device 104) the new project icon 128, then the user is prompted for the name of the new project and a new project is created.

When the user selects the save project icon 130, the order generation system 114 saves the current project to a storage device connected to the computer system 100. The user has the option of changing the name of the project when it is saved.

When the user selects the open project icon 132, the user is prompted for the name of the project to be opened. If the project of that name is found then it is opened and replaces the current project in the order generation system 114.

When the user selects the print icon 133, then the user interface 118 prints the current project.

When the user selects the delete icon 134, then order generation system 114 deletes the current selection (on the display). The undo icon 136 is used to undo previous deletions.

The configuration icons 138–148 are now described in greater detail.

By selecting the new typical icon 142, the user is able to select a typical workstation configuration which satisfies the user's requirements input in the planning stage (at P106).

When the user selects the new typical icon 142 a graphical depiction of various typical workstation configurations 180 is displayed on the screen. Each of these displayed typical configurations should satisfy some of the user's requirements, at least with regard to privacy, work area and electrical connectivity. Price and space requirements cannot always be satisfied until a complete clustered configuration is determined.

The user can select one of the displayed typical workstation configurations by clicking on it with the pointer device 104. The selected typical configuration is highlighted and displayed on the screen (at 182).

The system is pre-configured with a number of so-called typical configurations, and preferably the typicals displayed on the typical screen are those which satisfy the customer's criteria entered at the customer needs screen (reached by selecting the planning guide icon 166).

Figure 8:
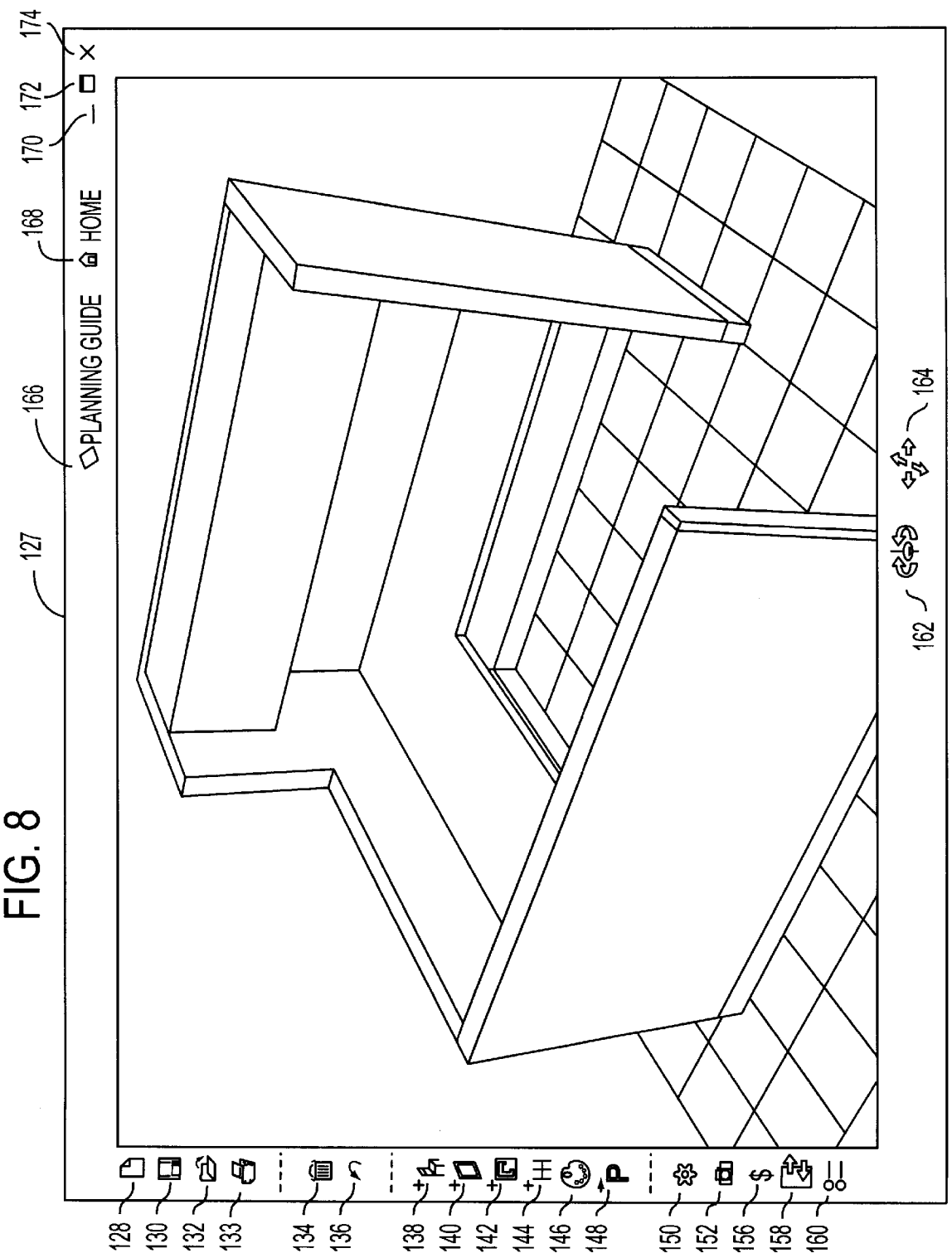

Once the user has selected the typical configuration that is to be used, the user can then double click with the pointer device 104 on the depiction of that typical in order to view it and operate on it. At that time the order generation system 114 displays a three-dimensional view of the selected typical on the screen on display 110 (FIG. 8). Preferably the selected typical furniture configuration is displayed with the appropriate colors and textures.

With reference to FIG. 8, the user can rotate and move the selected depicted typical workstation using the zoom icon 162 and the move icon 164, respectively. The depiction of the workstation can also be moved and rotated using the pointer device positioned on the object and then moved around the screen area. In this way the user can view the workstation from various angles and positions.

Preferably the image is displayed in a selected color and with a selected texture, that is, in the color and texture of the actual product. Selection of color and texture will be described below.

At any time, the typical configuration displayed on the screen can be modified by the user. This modification can be in the form of adding or removing components, changing the shape, size or color of a component or changing the properties of a component.

While viewing a configuration, the user can select product options. In order to pick product options, the user points and clicks the pointer device on the select material icon 148 on the screen 126. This causes the computer 100 to display the various materials screen on the display 110.

The properties screen allows the user to specify a workstation at a detailed level. Every attribute of every part in the workstation can be selected to create a customer's configuration which is then displayed on the screen. The system only allows a user to select valid attributes for each particular component. In that way each displayed configuration is consistent and valid as to its attributes.

Figure 9:
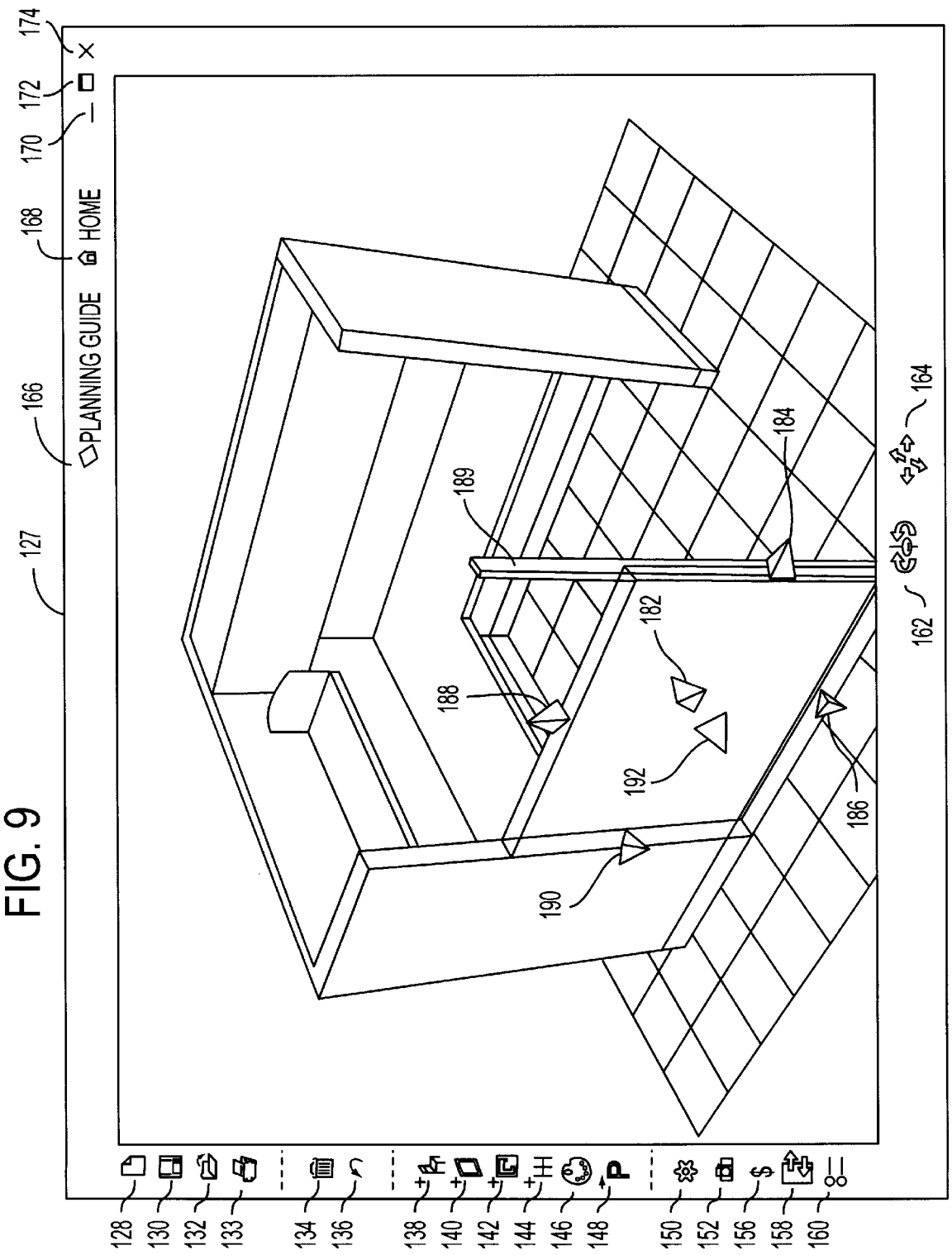

In order for the user to resize or reshape components, as shown in FIG. 9, the user selects the component 182 to be changed using the pointing device 104. When this is done, the selected component becomes highlighted on the screen and arrows (184–192) are shown to depict the various directions in which the part can be resized. The selected part 182 can also be repositioned at another location.

The order generation system 114 will only allow components to be resized or reshaped to valid shapes. To ensure this requirement, the user interface 118 checks each resize and reshape operation, while it is ongoing, using the product attribute database 120. However, components can be moved to temporarily invalid locations. As described below, if a component is moved, the configuration will have to be checked and may have to be changed.

In the example shown in FIG. 9, after the user has resized the component, the support 189 is too long. When the user selects the configuration option 150, the graphical user interface 118 invokes the modelling tool 116 which will replace the support 189 with one of the correct length.

Figure 10:
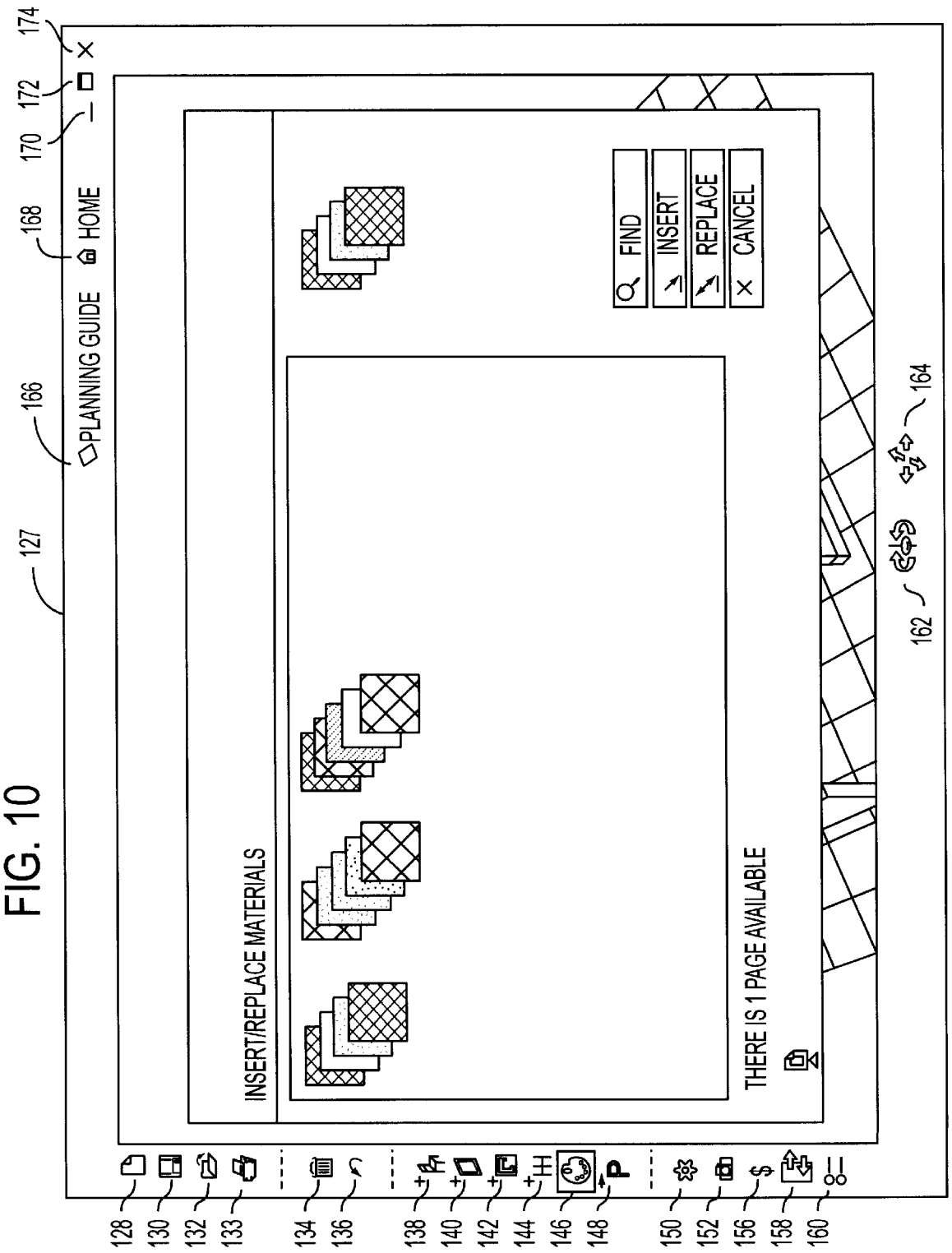
Figure 11:
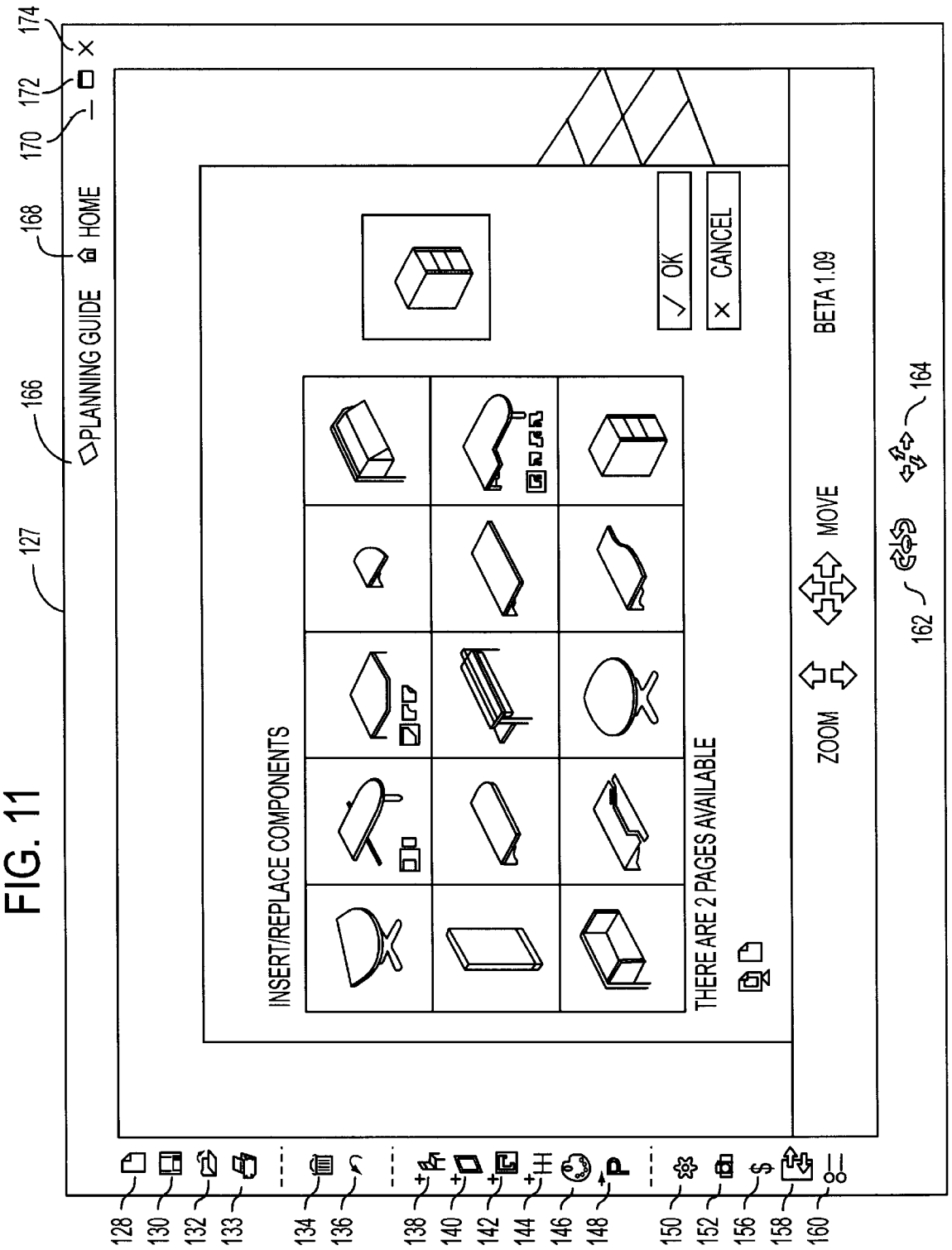

The user can apply fabric and finishes to a typical product by selecting the select material icon 146 with the pointer 104. This enables the user to change all fabric and finish options on each individual component or on all components. When the user selects the select material icon 146, order generation system 114 presents the user with fabric color and finish options on the screen as shown in FIG. 10. The order generation system 114 will only allow the user to change fabric or finish to valid (manufacturable components in the product line) options for the current components. In this way, the configuration depicted on the screen is always valid with respect to its fabric and finish. In order for the user to change a fabric or color, the user selects the appropriate option from those shown on the screen. The fabrics/colors are presented in families (three families in the example in FIG. 10), so that selecting one color for a particular component will change the other parts of that component to the appropriate color from the family.

If, at any time, the user wants to capture an image of the configuration depicted on the screen, the user can select the snapshot icon 152 which causes the rendered image to be enhanced by sharpening and adding depth. These images can then be printed or cut and pasted into other applications.

The user can add components to the depicted typical by selecting the component icon 140 with the pointer device. This causes the order generation system 114 to present the user with a selection of components which can be added to the configuration (FIG. 10). The selection includes shelves, panels, storage areas and the like. Generally any component from the product line can be added to a configuration.

Once a particular component is selected, the user positions that component on the typical configuration. The order generation system 114 will allow the user to position the component at an invalid location, since it is assumed that the entire configuration will be checked, and possibly adjusted, later. Thus, for example, the user is able to put a shelf on a panel that cannot support the shelf. This is acceptable since later the system will be reconfigured to replace the panel with one which can support the shelf. Alternatively, if no supporting panel is available in the product line, the shelf will not be added.

In order to check the validity (that is, if it can be manufactured from the specified product line and is otherwise a valid configuration) of a modified workstation, the user selects the configuration check icon 150 from the screen 126. This causes the order generation system 114 to invoke the checker module which ensures validity of the depicted configuration. Generally, the modelling tool 116 may indicate that the configuration is not feasible, feasible or it may provide various modifications. For example, it may recognize that one component may be split into two or vice versa. It will insert the appropriate support structure to ensure that the configuration can be built.

Once the modelling tool 116 is done with its processing, it returns control to the user.

Figure 12:
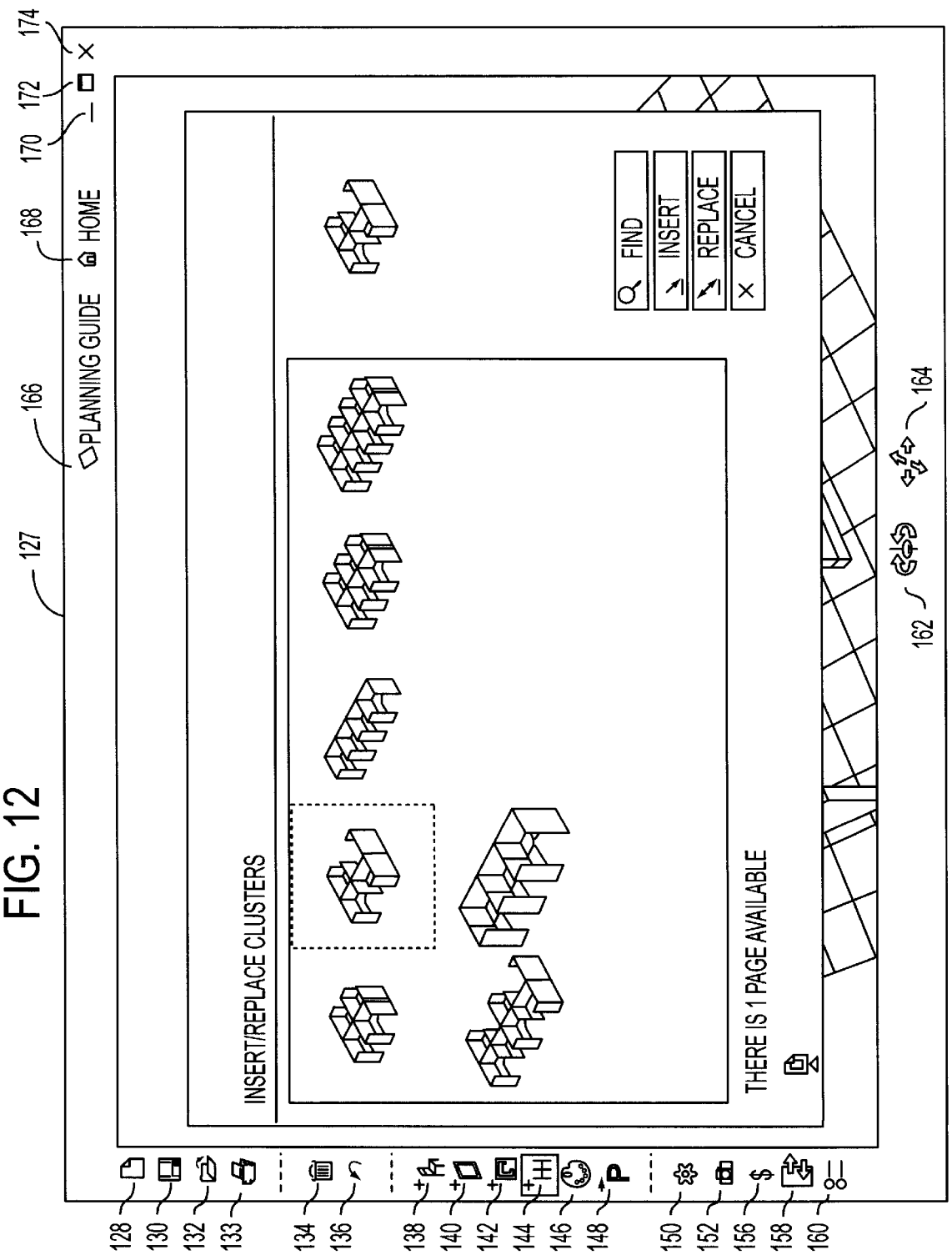

Once the user is satisfied with a particular typical configuration for a workspace, the user can generate a cluster of those typicals. In order to do this the user selects the "cluster" icon 144 from the screen 126. This causes the order generation system 114 to present the user with various clustering options (FIG. 12). The user can then select one of the displayed clustering options and the order generation system 114 generates the appropriate cluster of the current typical.

In generating a cluster of typicals, the order generation system 114 invokes the modelling tool 116 to ensure that the cluster is feasible. The modelling tool 116 removes redundant structures such as common walls and replaces multiple parts with individual parts if possible. If necessary the modelling tool 116 also checks the typical to ensure that it is a valid configuration.

Figure 13:
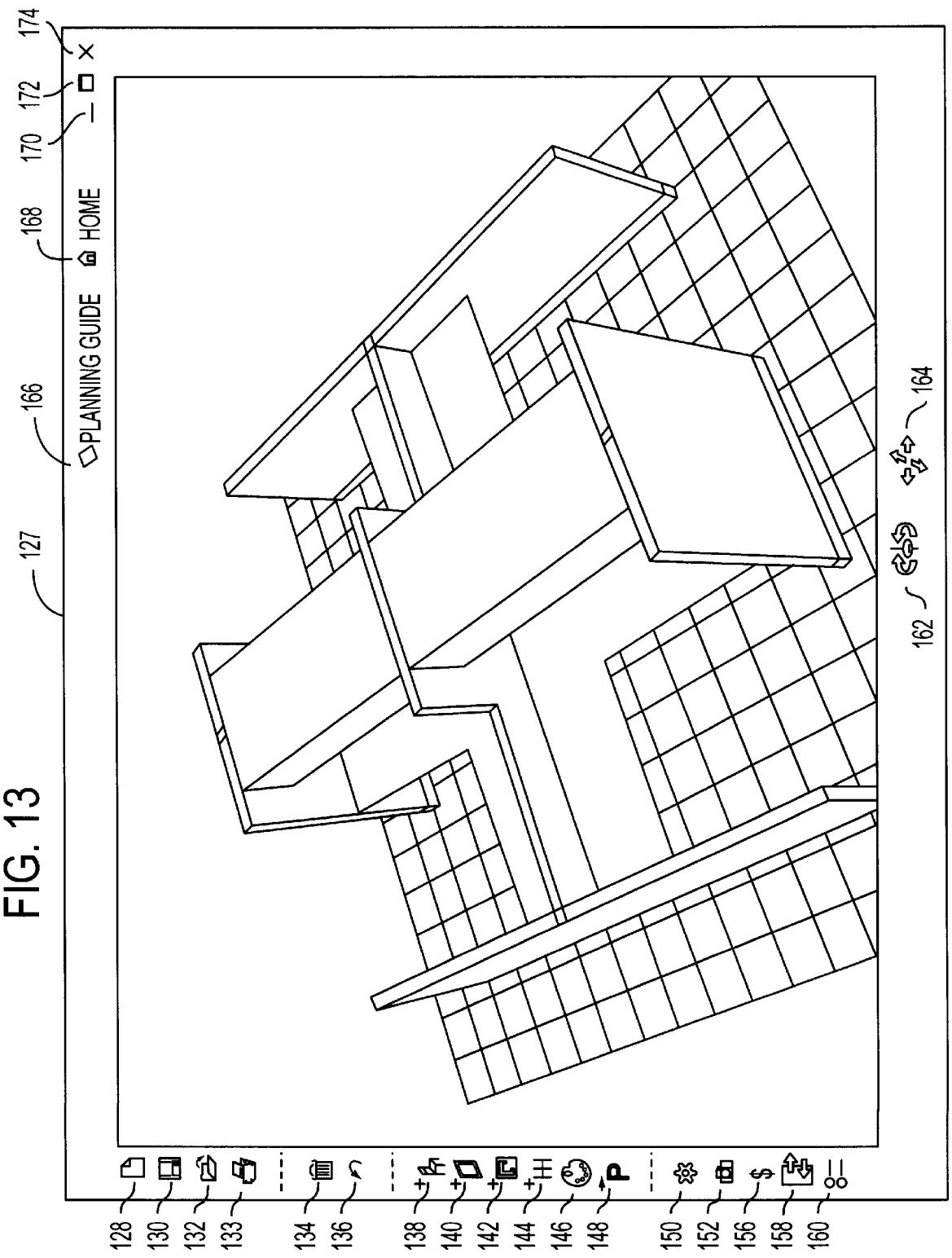

When done, the modelling tool 116 presents the user with a display of the selected cluster of typicals as shown in FIG. 13.

The user can add other detached items such as chairs to a configuration. To do this, the user selects the seating selection icon 138 from the screen 126. When this is done the order generation system 114 presents the user with a display of chairs such as shown in FIG. 14. The user can select one of the depicted chairs and that chair will be placed (freestanding) in the current cluster or typical.

Once the current typical and/or cluster configuration is acceptable to the user, its price can be determined using the price icon 156. Selecting the price icon 156 causes the order generation system 114 to determine the price of the entire configuration and to present it to the user as shown in FIG. 15. As can be seen from the quote depicted in FIG. 15, at this time each component item in the configuration is listed and details about that item are given. This quote is for a valid configuration and can be sent directly to the ordering department.

Alternatively, in some embodiments, when a finalized configuration is determined, the quote may be an estimate requiring checking.

As noted above, the modelling system 116 bases its determinations on the input user requirements and on information in the product attribute database. It also uses a model of the inter-relationships between the various components. An example of such a model is shown in the following tables.

In the relationship maps below, the properties are coded as follows: "L"=load bearing, "N"=Non-load bearing, "A"= Provides Aft Support, and "G"=Supplies Ground (Floor) Support.

| | | | |
|---|---|---|---|
| Environments | | | 9000 |
|   Service Parts | | | 9000 |
|     Interdependant Systems | | | 9000 |
|       Casegood Systems | | | 9000 |
|         Hanging Units | | | 3000 |
|           Hanging Shelves | | | 3000 |
| | premise_shelf | PRM | 3000 |
| | places_display_shelf | PLC | 3000 |
| | places_media_shelf | PLC | 3000 |
| | places_mini_corner_shelf | PLC | 3000 |
| | places_mini_end_of_run_shelf | PLC | 3000 |
| | places_mini_straight_shelf | PLC | 3000 |
| | places_monitor_shelf | PLC | 3000 |
| | places_pass_through_shelf | PLC | 3000 |
| | places_shelf | PLC | 3000 |
| | places_shelf_with_coat_rod | PLC | 3000 |
| | unigroup_media_shelf | UNI | 3000 |
| | unigroup_shelf | UNI | 3000 |
| | unigroup_shelf_with_coat_rod | UNI | 3000 |
|           Hanging Lateral Files | | | 3000 |
| | places_hanging_lateral_file | PLC | 3000 |
| | unigroup_hanging_lateral_file | UNI | 3000 |
|           Hanging Storage Units | | | 3000 |
| | premise_overhead_unit | PRM | 3000 |
| | places_overhead_unit | PLC | 3000 |
| | places_shelf_with_flipper_door | PLC | 3000 |
|         Attached Units | | | 4000 |
|           Attached Peds | | | 4000 |
| | premise_attached_pedestal | PRM | 4000 |
| | places_attached_fundamental_pedestal | PLC | 4000 |
| | places_attached_pedestal | PLC | 4000 |
| | unigroup_attached_fundamental_pedestal | UNI | 4000 |
| | unigroup_attached_pedestal | UNI | 4000 |
|           Attached Lateral Files | | | 4000 |
| | premise_attached_lateral_file | PRM | 4000 |
| | places_attached_lateral_file | PLC | 4000 |
|           Attached Bridges | | | 4000 |
| | premise_bridge | PRM | 4000 |
| | places_bridge | PLC | 4000 |
| | places_transition_bridge | PLC | 4000 |

-continued

| | | | |
|---|---|---|---|
| Attached Cabinets | | | 4000 |
| Upper Attached Cabinets | | | 4000 |
| | new_views_upper_unit | PLC | 4000 |
| | series_950_overfile | PLC | 4000 |
| Lower Attached Cabinets | | | 4000 |
| | premise_attached_storage_unit | PRM | 4000 |
| | new_views_lower_unit | PLC | 4000 |
| | places_credenza_door_unit | PLC | 4000 |
| Attached Corner Units | | | 4000 |
| | premise_corner_unit | PRM | 4000 |
| | premise_wrap_around_unit | PRM | 4000 |
| | places_corner_unit | PLC | 4000 |
| Attached Convergent Units | | | 4000 |
| | premise_convergent_unit | PRM | 4000 |
| | premise_convergent_wrap_around_d_unit | PRM | 4000 |
| | places_convergent_unit | PLC | 4000 |
| Attached Conference End Units | | | 4000 |
| | premise_conference_end_unit | PRM | 4000 |
| Attached Returns | | | 4000 |
| | premise_return | PRM | 4000 |
| | places_return | PLC | 4000 |
| | places_transition_return | PLC | 4000 |
| Attached Vertical Storage Units | | | 4000 |
| | premise_vertical_storage_unit | PRM | 4000 |
| | places_vertical_storage_unit | PLC | 4000 |
| Attached Casegoods Shelves | | | 4000 |
| | premise_bookcase_shelf | PRM | 4000 |
| | premise_storage_unit_shelf | PRM | 4000 |
| | places_bookcase_shelf | PLC | 4000 |
| | places_storage_unit_shelf | PLC | 4000 |
| | places_wardrobe_shelf | PLC | 4000 |
| | series_950_bookcase_shelf | PLC | 4000 |
| | series_950_cabinet_shelf | PLC | 4000 |
| | series_950_overfile_shelf | PLC | 4000 |
| Attached Credenzas | | | 4000 |
| | places_attached_credenza | PLC | 4000 |
| | series_950_credenza_file | PLC | 4000 |
| Mobile Units | | | 8000 |
| Mobile Peds | | | 8000 |
| | premise_mobile_pedestal | PRM | 8000 |
| | places_mobile_pedestal | PLC | 8000 |
| | unigroup_mobile_pedestal | UNI | 8000 |
| Mobile Tables | | | 8000 |
| | premise_mobile_conference_end_table | PRM | 8000 |
| | premise_mobile_teardrop_table | PRM | 8000 |
| | places_mobile_conference_end_table | PLC | 8000 |
| | places_mobile_keyboard_table | PLC | 8000 |
| | places_mobile_machine_table | PLC | 8000 |
| | places_mobile_round_table | PLC | 8000 |
| | places_mobile_teardrop_table | PLC | 8000 |
| | unigroup_mobile_keyboard_table | UNI | 8000 |
| | unigroup_mobile_machine_table | UNI | 8000 |
| Mobile Storage Units | | | 8000 |
| | new_views_mobile_cabinet | PLC | 8000 |
| Stationary Units | | | 9000 |
| Stationary Peds | | | 9000 |
| | places_stationary_fundamental_pedestal | PLC | 9000 |
| | places_stationary_pedestal | PLC | 9000 |
| | unigroup_stationary_fundamental_pedestal | UNI | 9000 |
| | unigroup_stationary_pedestal | UNI | 9000 |
| Stationary Tables | | | 9000 |
| | premise_rectangular_table | PRM | 9000 |
| | premise_round_table | PRM | 9000 |
| | premise_stationary_conference_end_table | PRM | 9000 |
| | premise_stationary_teardrop_table | PRM | 9000 |
| | places_c_leg_table | PLC | 9000 |
| | places_oval_table | PLC | 9000 |
| | places_racetrack_table | PLC | 9000 |
| | places_rectangular_table | PLC | 9000 |
| | places_square_table | PLC | 9000 |
| | places_stationary_conference_end_table | PLC | 9000 |
| | places_stationary_machine_table | PLC | 9000 |
| | places_stationary_round_table | PLC | 9000 |
| | places_stationary_teardrop_table | PLC | 9000 |
| | places_table_desk | PLC | 9000 |

-continued

|  |  |  |  |
|---|---|---|---|
|  | unigroup_oval_table | UNI | 9000 |
|  | unigroup_rectangular_table | UNI | 9000 |
|  | unigroup_round_table | UNI | 9000 |
|  | unigroup_square_table | UNI | 9000 |
| Stationary Vertical Files |  |  | 9000 |
| Stationary Lateral Files |  |  | 9000 |
|  | premise_stationary_lateral_file | PRM | 9000 |
|  | places_stationary_lateral_file | PLC | 9000 |
|  | series_950_combination_lateral_file | PLC | 9000 |
|  | series_950_lateral_file | PLC | 9000 |
| Stationary Bookcases |  |  | 9000 |
|  | premise_bookcase | PRM | 9000 |
|  | places_bookcase | PLC | 9000 |
|  | series_950_bookcase | PLC | 9000 |
| Stationary Desks |  |  | 9000 |
|  | premise_desk | PRM | 9000 |
|  | places_desk | PLC | 9000 |
| Stationary Credenzas |  |  | 9000 |
|  | premise_credenza | PRM | 9000 |
|  | places_stationary_credenza | PLC | 9000 |
| Stationary Wardrobes |  |  | 9000 |
|  | places_wardrobe | PLC | 9000 |
|  | series_950_wardrobe | PLC | 9000 |
| Stationary Cabinets |  |  | 9000 |
|  | premise_stationary_storage_unit | PRM | 9000 |
|  | new_views_stationary_cabinet | PLC | 9000 |
|  | new_views_storage_cabinet | PLC | 9000 |
|  | places_stationary_storage_unit | PLC | 9000 |
|  | series_950_storage_cabinet | PLC | 9000 |
| Suspended Units |  |  | 3000 |
| Suspended Peds |  |  | 3000 |
|  | places_suspended_fundamental_pedestal | PLC | 3000 |
|  | places_suspended_pedestal | PLC | 3000 |
|  | unigroup_suspended_fundamental_pedestal | UNI | 3000 |
|  | unigroup_suspended_pedestal | UNI | 3000 |
| Suspended Drawers |  |  | 3000 |
|  | premise_pencil_drawer | PRM | 3000 |
|  | places_pencil_drawer | PLC | 3000 |
|  | places_steel_pencil_drawer | PLC | 3000 |
|  | places_wood_pencil_drawer | PLC | 3000 |
| Casegood Accessories |  |  | 9000 |
|  | premise_lateral_file_counterweight | PRM | 9000 |
|  | premise_vertical_storage_unit_template | PRM | 9000 |
|  | places_flipper_door | PLC | 9000 |
|  | places_lateral_file_counterweight | PLC | 9000 |
|  | places_tug_a_ped | PLC | 9000 |
|  | places_vertical_storage_unit_retrofit_kit | PLC | 9000 |
|  | places_vertical_storage_unit_template | PLC | 9000 |
|  | series_950_bookcase_top | PLC | 9000 |
|  | series_950_counterweight | PLC | 9000 |
|  | series_950_credenza_double_top | PLC | 9000 |
|  | series_950_credenza_single_top | PLC | 9000 |
|  | series_950_lock_bar | PLC | 9000 |
|  | series_950_storage_coat_rod | PLC | 9000 |
|  | series_950_storage_media_bar | PLC | 9000 |
|  | unigroup_flipper_door | UNI | 9000 |
| Wall Systems |  |  | 1000 |
| Verticals |  |  | 1000 |
| Vertical Bases |  |  | 1000 |
| Mobile Bases |  |  | 1000 |
| Sliders |  |  | 1000 |
| Stationary Bases |  |  | 1000 |
| Beams |  |  | 1000 |
| Privacy Screens |  |  | 1000 |
| Scaffolds |  |  | 1000 |
| Panels |  |  | 1000 |
| Premise Panels |  |  | 1000 |
| Premise Doors |  |  | 1000 |
|  | premise_door | PRM | 1000 |
| Premise Glazed Panels |  |  | 1000 |
|  | premise_glazed_panel | PRM | 1000 |
| Premise Solid Panels |  |  | 1000 |
|  | premise_solid_panel | PRM | 1000 |

-continued

| | | | | |
|---|---|---|---|---|
| | Places Panels | | | 1000 |
| | Places Doors | | | 1000 |
| | | places_door | PLC | 1000 |
| | | places_double_door | PLC | 1000 |
| | | unigroup_door | UNI | 1000 |
| | Places Framed Panels | | | 1000 |
| | | places_open_panel | PLC | 1000 |
| | | unigroup_open_panel | UNI | 1000 |
| | Places Glazed Panels | | | 1000 |
| | Places Standard Glazed Panels | | | 1000 |
| | | places_glazed_panel | PLC | 1000 |
| | | unigroup_glazed_panel | UNI | 1000 |
| | Places Gabled Glazed Panels | | | 1000 |
| | | places_glazed_gabled_panel | PLC | 1000 |
| | Places Oblique Glazed Panels | | | 1000 |
| | | places_glazed_oblique_panel | PLC | 1000 |
| | Places Solid Panels | | | 1000 |
| | Places Standard Solid Panels | | | 1000 |
| | | places_solid_panel | PLC | 1000 |
| | | unigroup_solid_panel | UNI | 1000 |
| | Places Gabled Solid Panels | | | 1000 |
| | | places_gabled_panel | PLC | 1000 |
| | Places Oblique Solid Panels | | | 1000 |
| | | places_oblique_panel | PLC | 1000 |
| | Places Beltline Solid Panels | | | 1000 |
| | | places_beltline_panel | PLC | 1000 |
| | Places Ported Solid Panels | | | 1000 |
| | | places_ported_panel | PLC | 1000 |
| Stacked Verticals | | | | 2000 |
| Stack Kits | | | | 2000 |
| Pads | | | | 2000 |
| Extender Screens | | | | 2000 |
| Desking Screens | | | | 2000 |
| Fan Lights | | | | 6000 |
| | | places_fanlight | PLC | 6000 |
| Modesty Panels | | | | 2000 |
| | | places_convergent_modesty_panel | PLC | 2000 |
| | | places_corner_modesty_panel | PLC | 2000 |
| | | places_straight_modesty_panel | PLC | 2000 |
| Vertical Accessories | | | | 9000 |
| | | places_blind_kit | PLC | 9000 |
| | | places_counter_top_end_cover | PLC | 9000 |
| | | places_electronic_work_surface_end_cover | PLC | 9000 |
| | | places_muntin_kit | PLC | 9000 |
| | | places_wainscot_kit | PLC | 9000 |
| | | unigroup_electronic_work_surface_end_cover | UNI | 9000 |
| Horizontals | | | | 3000 |
| Work Surfaces | | | | 3000 |
| Corner Work Surfaces | | | | 3000 |
| Height Adjustable Corner Work Surfaces | | | | 3000 |
| | | places_height_adjustable_corner_work_surface | PLC | 3000 |
| | | places_height_adjustable_split_corner_work_surfa | PLC | 3000 |
| | | unigroup_height_adjustable_corner_work_surface | UNI | 3000 |
| | | unigroup_height_adjustable_split_corner_work_sur | UNI | 3000 |
| | Regular Corner Work Surfaces | | | 3000 |
| | | premise_corner_work_surface | PRM | 3000 |
| | | premise_wrap_around_work_surface | PRM | 3000 |
| | | places_corner_work_surface | PLC | 3000 |
| | | places_wrap_around_work_surface | PLC | 3000 |
| | | unigroup_corner_work_surface | UNI | 3000 |
| | | unigroup_wrap_around_work_surface | UNI | 3000 |
| | Electronic Corner Work Surfaces | | | 3000 |
| | | places_electronic_corner_work_surface | PRM | 3000 |
| | | unigroup_electronic_corner_work_surface | UNI | 3000 |
| | Transitional Corner Work Surfaces | | | 3000 |
| | | premise_transitional_wrap_around_work_surface | PRM | 3000 |
| | | places_transitional_corner_work_surface | PLC | 3000 |
| | | places_transitional_wrap_around_work_surface | PLC | 3000 |
| | | unigroup_transitional_corner_work_surface | UNI | 3000 |
| | | unigroup_transitional_wrap_around_work_surface | UNI | 3000 |

| | | | |
|---|---|---|---|
| Rectangular Work Surfaces | | | 3000 |
| Height Adjustable Rectangular Work Surfaces | | | 3000 |
| | places_height_adjustable_rectangular_work_surfac | PLC | 3000 |
| | unigroup_height_adjustable_rectangular_work_surf | UNI | 3000 |
| Regular Rectangular Work Surfaces | | | 3000 |
| *Premise Regular Rectangular Work Surfaces* | | | 3000 |
| | premise_radiused_rectangular_work_surface | PRM | 3000 |
| | premise_rectangular_work_surface | PRM | 3000 |
| | premise_split_rectangular_work_surface | PRM | 3000 |
| *Places Regular Rectangular Work Surfaces* | | | 3000 |
| | places_monitor_work_surface | PLC | 3000 |
| | places_radiused_rectangular_work_surface | PLC | 3000 |
| | places_rectangular_work_surface | PLC | 3000 |
| | places_rectangular_work_surface_top | PLC | 3000 |
| | places_split_rectangular_work_surface | PLC | 3000 |
| | unigroup_radiused_rectangular_work_surface | UNI | 3000 |
| | unigroup_rectangular_work_surface | UNI | 3000 |
| | unigroup_rectangular_work_surface_top | UNI | 3000 |
| | unigroup_split_rectangular_work_surface | UNI | 3000 |
| Electronic Rectangular Work Surfaces | | | 3000 |
| | places_electronic_rectangular_work_surface | PLC | 3000 |
| | unigroup_electronic_rectangular_work_surface | UNI | 3000 |
| Transitional Rectangular Work Surfaces | | | 3000 |
| | premise_transitional_rectangular_work_surface | PRM | 3000 |
| | places_transitional_rectangular_work_surface | PLC | 3000 |
| | unigroup_transitional_rectangular_work_surface | UNI | 3000 |
| Convergent Work Surfaces | | | 3000 |
| Regeular Convergent Work Surfaces | | | 3000 |
| | premise_convergent_work_surface | PRM | 3000 |
| | places_convergent_work_surface | PLC | 3000 |
| | unigroup_convergent_work_surface | UNI | 3000 |
| Shaped Convergent Work Surfaces | | | 3000 |
| | premise_shaped_wrap_around_work_surface | PRM | 3000 |
| | places_shaped_wrap_around_work_surface | PLC | 3000 |
| | unigroup_shaped_wrap_around_work_surface | UNI | 3000 |
| Conference Ends | | | 3000 |
| Regular Conference Ends | | | 3000 |
| | premise_conference_end_work_surface | PRM | 3000 |
| | places_conference_end_work_surface | PLC | 3000 |
| | unigroup_conference_end_work_surface | UNI | 3000 |
| Single Run Conference Ends | | | 3000 |
| | premise_curved_work_surface | PRM | 3000 |
| | premise_teardrop_end_work_surface | PRM | 3000 |
| | places_curved_work_surface | PLC | 3000 |
| | places_d_shaped_end_work_surface | PLC | 3000 |
| | places_teardrop_end_work_surface | PLC | 3000 |
| | unigroup_curved_work_surface | UNI | 3000 |
| | unigroup_teardrop_end_work_surface | UNI | 3000 |
| Countertops | | | 3000 |
| Straight Countertops | | | 3000 |
| | premise_rectangular_counter_top | PRM | 3000 |
| | places_rectangular_counter_top | PLC | 3000 |
| | places_wheelchair_reception_counter_top | PLC | 3000 |
| | unigroup_rectangular_counter_top | UNI | 3000 |
| Corner Countertops | | | 3000 |
| | places_corner_counter_top | PLC | 3000 |
| | unigroup_corner_counter_top | UNI | 3000 |
| Horizontal Accessories | | | 3000 |
| | premise_keyboard_holders | PRM | 3000 |
| | premise_mouse_pad | PRM | 3000 |
| | premise_palm_rest | PRM | 3000 |
| | places_carousel | PLC | 3000 |
| | places_corner_canopy | PLC | 3000 |
| | places_electronic_transition_cover | PLC | 3000 |
| | places_keyboard_holers | PLC | 3000 |
| | places_make_a_corner | PLC | 3000 |
| | places_mouse_pad | PLC | 3000 |
| | places_palm_rest | PLC | 3000 |

| | | | |
|---|---|---|---|
| | unigroup_carousel | UNI | 3000 |
| | unigroup_keyboard_holders | UNI | 3000 |
| | unigroup_make_a_corner | UNI | 3000 |
| | unigroup_mouse_pad | UNI | 3000 |
| | unigroup_palm_rest | UNI | 3000 |
| Table Tops | | | 3000 |
| Vertical Supports | | | 7000 |
|   Covers | | | 7000 |
|     Finish Covers | | | 7000 |
| | premise_variable_height_cover | PRM | 7000 |
| | places_canopy_finish_post | PLC | 7000 |
| | places_electrical_end_cap | PLC | 7000 |
| | places_end_of_run_post | PLC | 7000 |
| | places_finish_post | PLC | 7000 |
| | places_variable_end_of_run_post | PLC | 7000 |
| | unigroup_electrical_end_cap | UNI | 7000 |
| | unigroup_end_of_run_post | UNI | 7000 |
| | unigroup_finish_post | UNI | 7000 |
| | unigroup_variable_end_of_run_post | UNI | 7000 |
|     Electrical Covers | | | 7000 |
| | new_views_base_cover_kit | PLC | 7000 |
| | places_180_connector_cover | PLC | 7000 |
| | places_90_connector_cover | PLC | 7000 |
| | unigroup_180_connector_cover | UNI | 7000 |
| | unigroup_90_connector_cover | UNI | 7000 |
|   Connectors | | | 7000 |
|     T-Mount Kit | | | 7000 |
| | new_views_t_mount_bracket | PLC | 7000 |
|     Standard Connectors | | | 7000 |
| | premise_connector | PRM | 7000 |
| | places_hinge | PLC | 7000 |
| | unigroup_hinge | UNI | 7000 |
|   Modesty Panel Supports | | | 7000 |
| | places_modesty_to_cabinet_bracket | PLC | 7000 |
| | places_modesty_to_panel_bracket | PLC | 7000 |
|   Posts | | | 7000 |
|     Upper Posts | | | 7000 |
|     Lower Posts | | | 7000 |
|   Architectural Connections | | | 7000 |
| Horizontals Supports | | | 7000 |
|   Table Bases | | | 7000 |
|   Brackets | | | 7000 |
|     Panel Attached Brackets | | | 7000 |
| | premise_pedestal_to_panel_bracket | PRM | 7000 |
| | premise_work_surface_cantilever | PRM | 7000 |
| | premise_work_surface_corner_bracket | PRM | 7000 |
| | places_included_work_surface_cantilever | PLC | 7000 |
| | places_work_surface_cantilever | PLC | 7000 |
| | places_work_surface_corner_bracket | PLC | 7000 |
| | places_work_surface_panel_mount | PLC | 7000 |
| | places_work_surface_side_mount | PLC | 7000 |
| | places_work_surface_slope_mount | PLC | 7000 |
| | series_950_credenza_file_work_surface_support | PLC | 7000 |
| | unigroup_work_surface_cantilever | UNI | 7000 |
| | unigroup_work_surface_panel_mount | UNI | 7000 |
| | unigroup_work_surface_side_mount | UNI | 7000 |
| | unigroup_work_surface_slope_mount | UNI | 7000 |
|     Non-Panel Attached Brackets | | | 7000 |
| | premise_work_surface_drop_mount | PRM | 7000 |
| | premise_work_surface_flush_mount | PRM | 7000 |
| | new_views_cabinet_to_work_surface_bracket | PLC | 7000 |
| | places_work_surface_drop_mount | PLC | 7000 |
| | places_work_surface_flush_mount | PLC | 7000 |
| | unigroup_work_surface_drop_mount | UNI | 7000 |
| | unigroup_work_surface_flush_mount | UNI | 7000 |
|   Legs | | | 7000 |
| | premise_work_surface_support_leg | PRM | 7000 |
| | places_work_surface_support_leg | PLC | 7000 |
| | unigroup_work_surface_support_leg | UNI | 7000 |
|   Worksurface Support Panels | | | 7000 |
| | premise_work_surface_support_panel | PRM | 7000 |
| | places_conference_end_support | PLC | 7000 |

-continued

| | | | |
|---|---|---|---|
| | places_work_surface_end_full_support_panel | PLC | 7000 |
| | places_work_surface_end_half_support_panel | PLC | 7000 |
| | places_work_surface_support_panel | PLC | 7000 |
| | unigroup_work_surface_support_panel | UNI | 7000 |
| Height Adjustment Kits | | | 7000 |
| | premise_lateral_file_height_adjustment_kit | PRM | 7000 |
| | premise_pedestal_height_adjustment_kit | PRM | 7000 |
| | premise_storage_unit_height_adjustment_kit | PRM | 7000 |
| Adjustable Supports | | | 7000 |
| | places_height_adjustable_corner_mechanism | PLC | 7000 |
| | places_height_adjustable_rectangular_mechanism | PLC | 7000 |
| | places_height_adjustable_split_corner_mechanism | PLC | 7000 |
| | unigroup_height_adjustable_corner_mechanism | UNI | 7000 |
| | unigroup_height_adjustable_rectangular_mechnism | UNI | 7000 |
| | unigroup_height_adjustable_split_corner_mechnis | UNI | 7000 |
| Seating | | | 8000 |
|   Auditorium Seating | | | 8000 |
|   Adjustable Seating | | | 8000 |
| | accolade_caster_base_chair | STG | 8000 |
| | accolade_caster_base_stool | STG | 8000 |
| | improv_caster_base_chair | STG | 8000 |
| | improv_he_caster_base_chair | STG | 8000 |
|   Stackable Seating | | | 8000 |
| | improv_leg_base_stacking_chair | STG | 8000 |
|   Non-Adjustable Seating | | | 8000 |
| | accolade_sled_base_chair | STG | 8000 |
| | improv_leg_base_stool | STG | 8000 |
| | improv_sled_base_chair | STG | 8000 |
|   Lounge Seating | | | 8000 |
|     Benches | | | 8000 |
|     Single Lounge Seating | | | 8000 |
|     Multiple Lounge Seating | | | 8000 |
| Power and Data | | | 5000 |
|   Power and Data Providers | | | 5000 |
|     In-Feeds | | | 5000 |
| | premise_base_feed_module | PRM | 5000 |
| | premise_top_feed_module | PRM | 5000 |
| | places_base_feed_module | PLC | 5000 |
| | places_top_feed_module | PLC | 5000 |
| | unigroup_base_feed_module | UNI | 5000 |
| | unigroup_top_feed_module | UNI | 5000 |
|     Out-Feeds | | | 5000 |
| | premise_base_igr_receptacle | PRM | 5000 |
| | premise_base_receptacle | PRM | 5000 |
| | premise_panel_communications_port_kit | PRM | 5000 |
| | premise_panel_power_port_kit | PRM | 5000 |
| | places_base_igr_receptacle | PLC | 5000 |
| | places_base_igr_surge_protector_receptacle | PLC | 5000 |
| | places_base_receptacle | PLC | 5000 |
| | places_smart_work_surface_power_module | PLC | 5000 |
| | places_switching_system_kit | PLC | 5000 |
| | places_switching_system_power_supply | PLC | 5000 |
| | places_switching_system_receptacle | PLC | 5000 |
| | places_switching_system_wall_switch | PLC | 5000 |
| | places_work_surface_duplex_receptacle | PLC | 5000 |
| | places_work_surface_power_module | PLC | 5000 |
| | unigroup_base_igr_receptacle | UNI | 5000 |
| | unigroup_base_igr_surge_protector_receptacle | UNI | 5000 |
| | unigroup_base_receptacle | UNI | 5000 |
| | unigroup_smart_work_surface_power_module | UNI | 5000 |
| | unigroup_work_surface_duplex_receptacle | UNI | 5000 |
| | unigroup_work_surface_power_module | UNI | 5000 |
|   Power and Data Routers | | | 5000 |
|     Power and Data Channels | | | 5000 |
| | premise_vertical_wire_manager | PRM | 5000 |
| | places_cable_management_post | PLC | 5000 |
| | places_horizontal_wire_manager_33in | PLC | 5000 |
| | places_horizontal_wire_manager_40in | PLC | 5000 |
| | places_variable_height_cable_management_post | PLC | 5000 |
| | unigroup_cable_management_post | UNI | 5000 |
| | unigroup_horizontal_wire_manager | UNI | 5000 |
| | unigroup_vertical_wire_manager | UNI | 5000 |

| | | | |
|---|---|---|---|
| Power and Data Connectors | | | 5000 |
| | premise_extended_power_connector | PRM | 5000 |
| | premise_flexible_power_connector | PRM | 5000 |
| | premise_straight_span_power_connector | PRM | 5000 |
| | places_base_to_beltline_power_connector | PLC | 5000 |
| | places_beltline_to_beltline_power_connector | PLC | 5000 |
| | places_extended_power_connector | PLC | 5000 |
| | places_flexible_power_connector | PLC | 5000 |
| | places_straight_power_connector | PLC | 5000 |
| | unigroup_extended_power_connector | UNI | 5000 |
| | unigroup_flexible_power_connector | UNI | 5000 |
| | unigroup_straight_power_connector | UNI | 5000 |
| Cable Management | | | 5000 |
| | premise_grommet | PRM | 5000 |
| | premise_wire_management_loop | PRM | 5000 |
| | places_cable_management_beltline_cover_plate | PLC | 5000 |
| | places_cable_management_ported_cover_plate | PLC | 5000 |
| | places_cable_management_top_cap | PLC | 5000 |
| | places_grommet | PLC | 5000 |
| | places_wire_basket | PLC | 5000 |
| | places_wire_management_loop | PLC | 5000 |
| | places_wire_management_module | PLC | 5000 |
| | places_wire_manager | PLC | 5000 |
| | places_work_surface_power_module_storage | PLC | 5000 |
| | unigroup_work_surface_power_module_storage | UNI | 5000 |
| | unigroup_wire_basket | UNI | 5000 |
| | unigroup_wire_management_loop | UNI | 5000 |
| Lighting | | | 6000 |
| Horizontally Mounted Lighting | | | 6000 |
| | premise_task_light | PRM | 6000 |
| | premise_vertical_storage_task_light_bracket | PRM | 6000 |
| | places_canopy_light | PLC | 6000 |
| | places_counter_top_task_light | PLC | 6000 |
| | places_freestanding_pivot_head_task_light | PLC | 6000 |
| | places_task_light | | 6000 |
| | unigroup_counter_top_task_light | UNI | 6000 |
| | unigroup_freestanding_pivot_head_task_light | UNI | 6000 |
| | unigroup_task_light | UNI | 6000 |
| Vertically Mounted Lighting | | | 6000 |
| | places_grid_hung_pivot_head_task_light | PLC | 6000 |
| | places_panel_hung_fluorescent_light | PLC | 6000 |
| | places_panel_hung_pivot_head_task_light | PLC | 6000 |
| | places_panel_mounted_fluorescent_light | PLC | 6000 |
| | places_post_mount_street_light | PLC | 6000 |
| | places_street_light | PLC | 6000 |
| | unigroup_grid_hung_pivot_head_task_light | UNI | 6000 |
| | unigroup_panel_hung_fluorescent_light | UNI | 6000 |
| | unigroup_panel_hung_pivot_head_task_light | UNI | 6000 |
| | unigroup_panel_mounted_fluorescent_light | UNI | 6000 |
| | unigroup_post_mount_street_light | UNI | 6000 |
| | unigroup_street_light | UNI | 6000 |
| Floor Mounted Lighting | | | 6000 |
| Lighting Accessories | | | 6000 |
| | places_fluorescent_light_saddle_mount_kit | PLC | 6000 |
| | places_painted_shelf_task_light_bracket | PLC | 6000 |
| | places_vertical_storage_task_light_bracket | PLC | 6000 |
| | places_wood_shelf_task_light_bracket | PLC | 6000 |
| | unigroup_fluorescent_light_saddle_mount_kit | UNI | 6000 |
| | unigroup_shelf_task_light_bracket | UNI | 6000 |
| Organization | | | 9000 |
| Tackable Surfaces | | | 9000 |
| | premise_tackboard | PRM | 9000 |
| | places_grid_tackstrip | PLC | 9000 |
| | places_tackboard | PLC | 9000 |
| | unigroup_tackboard | UNI | 9000 |
| Markable Surfaces | | | 9000 |
| | premise_markerboard | PRM | 9000 |
| | places_markerboard | PLC | 9000 |
| | unigroup_markerboard | UNI | 9000 |

-continued

| | | | | |
|---|---|---|---|---|
| | Workflow Devices | | | 9000 |
| | Vertical Workflows | | | 9000 |
| | | premise_all_purpose_hook | PRM | 9000 |
| | | premise_lateral_file_drawer_compressor | PRM | 9000 |
| | | premise_lateral_file_drawer_divider | PRM | 9000 |
| | | premise_lateral_file_front_to_back_hanging_bar | PRM | 9000 |
| | | premise_lateral_file_side_to_side_hanging_bar | PRM | 9000 |
| | | premise_pedestal_drawer_divider | PRM | 9000 |
| | | premise_shelf_divider | PRM | 9000 |
| | | paper_management_bar | PLC, PRM | 9000 |
| | | paper_management_freestanding_vertical_unit | PLC, PRM | 9000 |
| | | paper_management_suspended_vertical_unit | PLC, PRM | 9000 |
| | | new_views_shelf_divider | PLC | 9000 |
| | | places_all_purpose_hook | PLC | 9000 |
| | | places_fundamental_pedestal_hanging_bar | PLC | 9000 |
| | | places_fundamental_pedestal_side_to_side_divide | PLC | 9000 |
| | | places_lateral_file_front_to_back_hanging_bar | PLC | 9000 |
| | | places_organization_grid | PLC | 9000 |
| | | places_shelf_divider | PLC | 9000 |
| | | places_vertical_storage_unit_grid | PLC | 9000 |
| | | tri_mode_paper_management_bar | PLC, UNI | 9000 |
| | | tri_mode_vertical_unit | PLC, UNI | 9000 |
| | | series_950_drawer_compressor | PLC | 9000 |
| | | series_950_drawer_divider | PLC | 9000 |
| | | series_950_front_to_back_hanging_bar | PLC | 9000 |
| | | series_950_side_to_side_hanging_bar | PLC | 9000 |
| | | unigroup_all_purpose_hook | UNI | 9000 |
| | | unigroup_shelf_divider | UNI | 9000 |
| | Horizontal Workflows | | | 9000 |
| | | premise_pedestal_pencil_tray | PRM | 9000 |
| | | paper_management_freestanding_horizontal_unit | PLC, PRM | 9000 |
| | | paper_management_suspended_horizontal_unit | PLC, PRM | 9000 |
| | | paper_management_trays | PLC, PRM | 9000 |
| | | paper_management_under_shelf_unit | PLC | 9000 |
| | | places_freestanding_grid_mailbox | PLC | 9000 |
| | | places_fundamental_pedestal_tray | PLC | 9000 |
| | | places_grid_mailbox | PLC | 9000 |
| | | places_grid_reference_tray | PLC | 9000 |
| | | tri_mode_divider | PLC, UNI | 9000 |
| | | tri_mode_hanger_clip | PLC, UNI | 9000 |
| | | tri_mode_horizontal_shelves | PLC, UNI | 9000 |
| | | tri_mode_horizontal_unit | PLC, UNI | 9000 |
| | Diagonal Workflows | | | 9000 |
| | | paper_management_freestanding_diagonal_unit | PLC, PRM | 9000 |
| | | paper_management_suspended_diagonal_unit | PLC, PRM | 9000 |
| | | tri_mode_diagonal_unit | PLC, UNI | 9000 |
| | Workflow Bins | | | 9000 |
| | | places_grid_diskette_bin | PLC | 9000 |
| | | places_grid_storage_bin | PLC | 9000 |
| Services | | | | 9000 |

Relationship Maps

| Class Structure | Component Name | Prod Line | Properties | Inherits From | C# | Constraint Relationships | L# | Light Weight Relationships |
|---|---|---|---|---|---|---|---|---|
| Environments | | | | N/A | | | 1 | "LWC: Environments" (Overridden at lower class levels) |
| Service Parts | | | | $A$3 | | | ??? | |
| Interdependant Systems | | | | N/A | | | ??? | |
| Casegood Systems | | | | $B$5 | | | ??? | |
| Hanging Units | | | | $C$6 | 1 | "Hang Stuff" AND "HU" | 1 | "LW Hang Stuff" |
| Hanging Shelves | | | | $D$7 | | Inh | Inh | |
| | premise_shelf | PRM | | | Inh | | Inh | |
| | places_display_shelf | PLC | | | Inh | | Inh | |
| | places_media_shelf | PLC | | | Inh | | Inh | |
| | places_mini_corner_shelf | PLC | | | Inh | | Inh | |
| | places_mini_end_of_run_shelf | PLC | | | Inh | | Inh | |
| | places_mini_straight_shelf | PLC | | | Inh | | Inh | |
| | places_monitor_shelf | PLC | | | Inh | | Inh | |
| | places_pass_through_shelf | PLC | | | 1 | Requires and open panel | 1 | Override x/z_pos such that panel bisects shelf |
| | places_shelf | PLC | | | Inh | | Inh | |
| | places_shelf_with_coat_rod | PLC | | | Inh | Inh | | |
| Attached Units | | | | $C$6 | 1 | if attaching to a member of X_Credenzas or X_Desks, must attach to the "open" front | | |
| Attached Peds | premise_attached_pedestal | PRM | AFG | $D$25 | 1 | "AP" | 1 | "Set AP Depth" and "Place Storage" |
| | places_attached_fundamental_pedestal | PLC | AFG | | 1 | "AP prm-ap" | | |
| | places_attached_pedestal | PLC | | | Inh | | Inh | |
| Attached Lateral Files | premise_attached_lateral_file | PRM | AFG | $D$25 | 1 | "ALF" | 1 | "Sep AP Depth" and "Place Storage" |
| | places_attached_lateral_file | PLC | | | 1 | "ALF" | 1 | "Place Storage" |
| Attached Bridges | premise_bridge | PRM | | $D$25 | 1 | "AB" | 1 | "Center on Floor" AND "Attach Bridge/Return" |
| | places_bridge | PLC | | | Inh | | Inh | |
| | places_transition_bridge | PLC | | | Inh | | Inh | |
| Attached Cabinets | | | | $D$25 | | | | |
| Upper Attached Cabinets | new_views_upper_unit | PLC | | $E$37 | 1 | "UAC nv-uu" | ??? | |
| | series_951_overfile | PLC | | | ??? | Must sit on top of ??? | ??? | |
| Lower Attached Cabinets | premise_attached_storage_unit | PRM | | $E$37 | 1 | "LAC" | ??? | |
| | new_views_lower_unit | PLC | | | 1 | "LAC prm-astu" | 1 | "Center on Floor" and "Set LWC Position Attached Lateral File And Storage Unit" |
| | places_credenza_door_unit | PLC | | | 1 | "LAC nv-lu" | ??? | |
| Attached Corner Units | | | | $D$25 | 1 | Both sides must attach to a member of Attached_Returns/Bridges/Credenzas/Desks | 1 | "Center on Floor" |
| | premise_corner_unit | PRM | | | Inh | | Inh | |
| | premise_wrap_around_unit | PRM | | | Inh | | Inh | |
| | places_corner_unit | PLC | | | Inh | | Inh | |

-continued

| Class Structure | Component Name | Prod Line | Prod Properties | Inherits From | C# | Constraint Relationships | L# | Light Weight Relationships |
|---|---|---|---|---|---|---|---|---|
| Attached Convergent Units | | | | | | | | |
| | premise_convergent_unit | PRM | | $D$25 | 1 | "AConvU" | 1 | "Center on Floor" |
| | premise_convergent_wrap_around_d_unit | PRM | | 49 | Inh | | Inh | |
| | places_convergent_unit | PLC | | | Inh | | Inh | |
| Attached Conference End Units | | | | | | | | |
| | premise_conference_end_unit | PRM | | $D$25 | Inh | | 1 | "Center on Floor" |
| Attached Returns | | | | | | | | |
| | premise_return | PRM | | $D$25 | 1 | "ARet" | 1 | "Center on Floor" |
| | places_return | PLC | | | Inh | | Inh | |
| | | | | | 1 | If 30" panel used as return, WS must use brackets, not cantilevers | | |
| | places_transition_return | PLC | | | 1 | If 30" panel used as return, WS must use brackets, not cantilevers | Inh | |
| Attached Vertical Storage Units | | | | | | | | |
| | premise_vertical_storage_unit | PRM | | $D$25 | 1 | "AVSU" | 1 | "Center of Floor" |
| | places_vertical_storage_unit | PLC | | | Inh | | Inh | |
| Attached Casegoods Shelves | | | | | | | | |
| | premise_bookcase_shelf | PRM | | $D$25 | Inh | | 1 | LWC: ACS |
| | premise_storage_unit_shelf | PRM | | | n/a | ACCESSORY | n/a | ACCESSORY |
| | places_bookcase_shelf | PLC | | | n/a | ACCESSORY | n/a | ACCESSORY |
| | places_storage_unit_shelf | PLC | | | n/a | ACCESSORY | n/a | ACCESSORY |
| | places_wardrobe_shelf | PLC | | | n/a | ACCESSORY | n/a | ACCESSORY |
| | series_951_bookcase_shelf | PLC | | | n/a | ACCESSORY | n/a | ACCESSORY |
| | series_951_cabinet_shelf | PLC | | | n/a | ACCESSORY | n/a | ACCESSORY |
| | series_951_overfile_shelf | PLC | | | n/a | ACCESSORY | n/a | ACCESSORY |
| Attached Credenzas | | | | | | | | |
| | places_attached_credenza | PLC | | $D25 | 1 | Must attach to a member of X_Corners or X_Desks | 1 | "Center on Floor" |
| | series_951_credenza_file | PLC | | | Inh | must sit under worksurface, flush to front - exactly the same as Attached Drawer Pedestal (has no top) | Inh | |
| Mobile Units | | | | | | | | |
| Mobile Peds | | | | | | | | |
| | premise_mobile_pedestal | PRM | | $C$6 | 1 | Must sit on floor | 1 | "Center on Floor" |
| | places_mobile_pedestal | PLC | | $D$75 | Inh | | Inh | |
| Mobile Tables | | | | | | | | |
| | premise_mobile_conference_end_table | PRM | | $D$75 | Inh | | Inh | |
| | premise_mobile_teardrop_table | PRM | | | Inh | | Inh | |
| | places_mobile_conference_end_table | PLC | | | Inh | | Inh | |
| | places_mobile_keyboard_table | PLC | | | Inh | | Inh | |
| | places_mobile_machine_table | PLC | | | Inh | | Inh | |
| | places_mobile_round_table | PLC | | | Inh | | Inh | |
| | places_mobile_teardrop_table | PLC | | | Inh | | Inh | |
| Mobile Storage Units | | | | | | | | |
| | new_views_mobile_cabinet | PLC | | $D$75 | Inh | | Inh | |

-continued

| Class Structure | Component Name | Prod Line | Properties | Inherits From | Relationship Maps C# | Constraint Relationships | L# | Light Weight Relationships |
|---|---|---|---|---|---|---|---|---|
| Stationary Units | | | | | | | | |
| Stationary Peds | | | | | | | | |
| | places_stationary_fundamental_pedestal | PLC | | $C$6 | 1 | Must sit on floor $D$88 | 1 | "Center on Floor" |
| | places_stationary_pedestal | PLC | | | ??? | | | Inh |
| Stationary Tables | | | | $D$88 | | | | Inh |
| | premise_rectangular_table | PRM | | | ??? | | | Inh |
| | premise_round_table | PRM | | | ??? | | | Inh |
| | premise_stationary_conference_end_table | PRM | | | ??? | | | Inh |
| | premise_stationary_teardrop_table | PRM | | | ??? | | | Inh |
| | places_c_leg_table | PLC | | | ??? | | | Inh |
| | places_oval_table | PLC | | ??? | | Inh | | |
| | places_racetrack_table | PLC | | | ??? | | | Inh |
| | places_rectangular_table | PLC | | | ??? | | | Inh |
| | places_square_table | PLC | | | ??? | | | Inh |
| | places_stationary_conference_end_table | PLC | | | ??? | | | Inh |
| | places_stationary_machine_table | PLC | | | ??? | | | Inh |
| | places_stationary_round_table | PLC | | | ??? | | | Inh |
| | places_stationary_teardrop_table | PLC | | | ??? | | | Inh |
| | places_table_desk | PLC | | | ??? | | | Inh |
| Stationary Vertical Files | | | | $D$88 | | | | Inh |
| Stationary Lateral Files | | | | $D$88 | | | | Inh |
| | premise_stationary_lateral_file | PRM | | | ??? | stands there - Is configurable (4 heights) - work like drawer pedestals | | |
| | places_stationary_lateral_file | PLC | | | ??? | stands there - 2/3/4/5 high - settable via properties | | |
| | series_951_combination_lateral_file | PLC | | | | | | |
| | series_951_lateral_file | PLC | | $D$88 | | 2/3/4/5 high - settable via properties | | |
| Stationary Bookcases | | | | | | | | |
| | premise_bookcase | PRM | | | Inh | | | Inh |
| | places_bookcase | PLC | | | Inh | | | Inh |
| | series_951_bookcase | PLC | | $D$88 | Inh | | | Inh |
| Stationary Desks | | | | | | | | |
| | premise_desk | PRM | | | ??? | | | Inh |
| | places_desk | PLC | | $D$88 | ??? | | | Inh |
| Stationary Credenzas | | | | | | | | |
| | premise_credenza | PRM | | | ??? | | | Inh |
| | places_stationary_credenza | PLC | | $D$88 | ??? | | | Inh |
| Stationary Wardrobes | | | | | | | | |
| | places_wardrobe | PLC | | | ??? | Stands there, only 1 size (uses series_951_storage_cabinet metafile) | | Inh |
| | series_951_wardrobe | PLC | | $D$88 | | | | Inh |
| Stationary Cabinets | | | | | | | | |
| | premise_stationary_storage_unit | PRM | | | ??? | | | Inh |
| | new_views_stationary_cabinet | PLC | | | Inh | | | Inh |
| | new_views_storage_cabinet | PLC | | | Inh | | | Inh |

-continued

| Class Structure | Component Name | Prod Line | Properties | Relationship Maps Inherits From | C# | Constraint Relationships | L# | Light Weight Relationships |
|---|---|---|---|---|---|---|---|---|
| Suspended Units | | | | | | | | |
| Suspended Peds | places_stationary_storage_unit | PLC | | | Inh | | | Inh |
| | series_951_storage_cabinet | PLC | | $C$6 | | Stands there - 4 or 5 high - no shelves or 3 shelves | | |
| | places_suspended_fundamental_pedestal | PLC | | $D$132 | 1 | Mounts under WS, Return, Desk, or Credenza - | 1 | "Place Storage" AND "LWC: Set SP Depth/Pos" |
| | places_suspended_pedestal | PLC | | | Inh | | | Inh |
| Suspended Drawers | | | | $D$132 | Inh | | | Inh |
| | premise_pencil_drawer | PRM | | | 1 | Must Mount to Front Edge of Worksurface | ??? | |
| | places_pencil_drawer | PLC | | | Inh | | ??? | |
| | places_steel_pencil_drawer | PLC | | | Inh | | ??? | |
| | places_wood_pencil_drawer | PLC | | | Inh | | ??? | |
| Casegood Accessories | | | | $C$6 | | | | |
| | premise_lateral_file_counterweight | PRM | | | Dep | ACCESSORY | n/a | ACCESSORY (Note; 1 included with 2-highs) |
| | premise_vertical_storage_unit_te;plate | PRM | | | Dep | ACCESSORY | n/a | ACCESSORY |
| | places_flipper_door | PLC | | | ??? | | ??? | |
| | places_lateral_file_counterweight | PRM | | | Dep | ACCESSORY | n/a | ACCESSORY (Note: 1 included with 2-highs) |
| | places_tug_a_ped | PLC | | | Dep | ACCESSORY | n/a | ACCESSORY |
| | places_vertical_storage_unit_retrofit_kit | PLC | | | n/a | ACCESSORY | n/a | ACCESSORY |
| | places_vertical_storage_unit_template | PLC | | | n/a | ACCESSORY | n/a | ACCESSORY |
| | series_950_bookcase_top | PLC | | | | Must be the same size as target bookcase | | |
| | series_950_counterweight | PLC | | | n/a | ACCESSORY | n/a | ACCESSORY |
| | series_950_credenza_double_top | PLC | | | | contiguous top for 2 bins of same height and width used when a CF is in the opeN | | |
| | series_950_credenza_single_top | PLC | | | n/a | ACCESSORY | | |
| | series_950_lock_bar | PLC | | | n/a | ACCESSORY | | |
| | series_950_storage_coat_rod | PLC | | | n/a | ACCESSORY | | |
| | series_950_storage_media_bar | PLC | | | | | | |
| Wall Systems | | | | | | | | |
| Verticals | | | | $B$5 | | | | |
| Vertical Bases | | | | $C$156 | | | | |
| Mobile Bases | | | | $D$157 | | | | |
| Sliders | | | | $E$158 | | | | |
| Stationary Bases | | | | $F$159 | | | | |
| Beams | | | | $F$158 | | | | |
| Privacy Screens | | | | $F$161 | | | | |
| Scaffolds | | | | $F$161 | | | | |
| Panels | | | | $F$161 | 1 | Panels Require Support (Physical Constraint) | 1 | "LWC: Panels" |
| Premise_Panels | | | | $G$165 | 1 | "PRM Panels" | | |
| Premise_Doors | | | | $H$166 | 1 | "PRM Doors" | | |
| | premise_door | PRM | | | Inh | | | Inh |
| Premise Glazed Panels | | | | $H$166 | | | | |
| | premise_glazed_panel | PRM | | | Inh | | | Inh |
| Premise Solid Panels | | | | $H$166 | | | | |
| | premise_solid_panel | | | | 1 | "PSP prm-sp" | | Inh |

-continued

| Class Structure | Component Name | Prod Line | Properties | Inherits From | C# | Constraint Relationships | L# | Light Weight Relationships |
|---|---|---|---|---|---|---|---|---|
| Places Panels | | | | $G$165 | 1 | "PLC Panels" | | |
| Places Doors | | | | $H$173 | 1 | Door-Swing must match the direction of the return panel and the hinged side of the door should be towards the supporting panels | Inh | |
| | places_door | PLC | | | 1 | Must have a return panel >=24"0 deep that's <=24" unloaded standard panel away from hinge | Inh | |
| | places_double_door | PLC | | | 1 | Must have a return panel at each hinge - i.e. 0" away | Inh | |
| Places Framed Panels | | | | $H$173 | 1 | Framed Panels Have Restrictions (Physics Constraint) | | |
| Glazed Panels | places_open_panel | PLC | | $H$173 | | | Inh | |
| Standard Glazed Panels | | | | $I$179 | | | Inh | |
| | places_glazed_panel | PLC | | $I$179 | | | Inh | |
| Gabled Glazed Panels | places_glazed_gabled_panel | PLC | | $I$179 | | | Inh | |
| blique Glazed Panels | places_glazed_oblique_panel | PLC | | $I$179 | | | Inh | |
| Solid Panels | | | | $H$173 | | | Inh | |
| Standard Solid Panels | places_solid_panel | PLC | | $I$186 | | | Inh | |
| Gabled Solid Panels | places_gabled_panel | PLC | | $I$186 | | | Inh | |
| Oblique Solid Panels | places_oblique_panel | PLC | | $I$186 | | | Inh | |
| Beltline Solid Panels | places_beltline_panel | PLC | | $I$186 | 1 | If >10' run with WS, requires orner braces at ends | Inh | |
| Ported Solid Panels | places_ported_panel | PLC | | $I$186 | | | Inh | |
| Stacked Verticals | | | | $D$157 | | | | |
| Stack Kits | | | | $E$197 | | | | |
| Pads | | | | $E$197 | | | | |
| Extender Screens | | | | $E$197 | | | | |
| Desking Screens | | | | $E$197 | | | | |
| Fan Lights | places_fanlight | PLC | | $E$197 | 1 | "FL" | Inh | |
| Modesty Panels | | | | $D$157 | | | | |
| | places_convergent_modesty_panel | PLC | | | n/a | NOT IN PHASE I | n/a | NOT IN PHASE I |
| | places_corner_modesty_panel | PLC | | | n/a | NOT IN PHASE I | n/a | NOT IN PHASE I |
| | places_straight_modesty_panel | PLC | | | | | | |
| Vertical Accessories | | | | $D$157 | | | | |
| | places_blind_kit | PLC | | | | | | |
| | places_counter_top_end_cover | PLC | | | | | | |

-continued

| Class Structure | Component Name | Prod Line | Properties | Inherits From | C# | Constraint Relationships | L# | Light Weight Relationships |
|---|---|---|---|---|---|---|---|---|
| | places_electronic_work_surface_end_cover | PLC | | | | | | |
| | places_muntin_kit | PLC | | $C$156 | 1 | Must attach to Places Glazed_Panels, matching its size | 1 | "Hang Stuff" |
| | places_wainscot_kit | PLC | L | $D$214 | 1 | Must attach to Places Glazed_Panels, matching its size | | |
| Horizontals | | | | | | | | |
| Work Surfaces | | | | | | | | |
| Corner Work Surfaces | | | | $E$215 | 1 | "Hang Stuff" AND "Work Surfaces" | | |
| Height Adjustable Corner Work Surfaces | | | | $F$216 | 1 | Require "3-corner" support | | |
|   places_height_adjustable_corner_work_surface | PLC | | | | | | | |
|   places_height_adjustable_split_corner_work_surface | PLC | | | | | | | |
| Regular Corner Work Surfaces | | | | $F$216 | | | | |
|   premise_corner_work_surface | PRM | | | | 1 | "RComWS rm-cws" | | |
|   premise_wrap_around_work_surface | PRM | | | | 1 | "RComWS prm-waws" | | |
|   places_corner_work_surface | PLC | | | | | | | |
|   places_wrap_around_work_surface | PLC | | | | | | | |
| Electronic Corner Work Surfaces | | | | $F$216 | 1 | If 2 adjacent electronic WS are separated by 2" gap (i.e. they span a 3-way junction) they need 1 places_electronic_work_surface_transition_cover between them | | |
|   places_electronic_corner_work_surface | PLC | | | | | | | |
| Transitional Corner Work Surfaces | | | | $F$216 | 1 | "TCWS prm-twaws" | | |
|   premise_transitional_wrap_around_work_surface | PRM | | | | | | | |
|   places_transitional_corner_work_surface | PLC | | | | | | | |
|   places_transitional_wrap_around_work_surface | PLC | | | | | | | |
| Rectangular Work Surfaces | | | | $E$215 | | | | |
| Height Adjustable Rectangular Work Surface | | | | $F$231 | | | | |
|   places_height_adjustable_rectangular_work_surface | PLC | | | | | | | |
| Regular Rectangular Work Surfaces | | | | $F$231 | 1 | "RegRectWS" | | |
| Premise_Regular_Rectangular_Work_Surfaces | | | | $G$234 | 1 | Premise Work Surfaces must have floor support every 5' | | |
|   premise_radiused_rectangular_work_surface | PRM | | | | 1 | "PRRWS prm-rrws" | | |
|   premise_rectangular_work_surface | PRM | | | | 1 | "PRRWS prm-rws" | | |
|   premise_split_rectangular_work_surface | PRM | | | | 1 | "PRRWS prm-srws" | | |
| Places Regular Rectangular Work Surfaces | | | | $G$234 | | | | |
|   places_monitor_work_surface | PLC | | | | | | | |
|   places_radiused_rectangular_work_surface | PLC | | | | | | | |
|   places_rectangular_work_surface | PLC | | | | | | | |
|   places_rectangular_work_surface_top | PLC | | | | | | | |
|   places_split_rectangular_work_surface | PLC | | | | | | | |
| Electronic Rectangular Work Surfaces | | | | $F$231 | 1 | If 2 adjacent electronic WS are separated by 2" gap (i.e. they span 3-way junction) they need 1 places_electronic_work_surface_transition_cover between them | | |
|   places_electronic_rectangular_work_surface | PLC | | | | | | | |

-continued

| Class Structure | Component Name | Prod Line | Properties | Inherits From | Relationship Maps C# | Constraint Relationships | L# | Light Weight Relationships |
|---|---|---|---|---|---|---|---|---|
| Transitional Rectangular Work Surfaces | | | | $F$231 | | | | |
| | premise_transitional_rectangular_work_surface | PRM | | | 1 | "TRWS prm-trws" | | |
| | places_transitional_rectangular_work_surface | PLC | | $E$215 | | | | |
| Convergent Work Surfaces | | | | | 1 | If Places, may mount to a panel up to six inches narrower than the convergent (panel run must be => than the width of the convergent) | | |
| Regular Convergent Work Surfaces | | | | $F$250 | | | | |
| | premise_convergent_work_surface | PRM | | | 1 | "RConvWS prm-cws" | | |
| | places_convergent_work_surface | PLC | | | 1 | "RConvWS plc-cws" | | |
| Shaped Convergent Work Surface | | | | $F$250 | | | | |
| | premise_shaped_wrap_around_work_surface | PRM | | | 1 | "SCWS prm-swaws" | | |
| | places_shaped_wrap_around_work_surface | PLC | | $E$215 | | | | |
| Conference Ends | | | | $E$257 | | | | |
| Regular Conference Ends | | | | | 1 | Attaches to 2 worksurfaces with panel between | | |
| | premise_conference_end_work_surface | PRM | | | 1 | "RCE prm-cews" | | |
| | places_conference_end_work_surface | PLC | | $F$257 | | | | |
| Single Run Conference Ends | | | | | 1 | "SRCE prm-cws" | | |
| | premise_curved_work_surface | PRM | | | 1 | "SRCE prm-tews" | | |
| | premise_teardrop_end_work_surface | PRM | | | | | | |
| | places_curved_work_surface | PLC | | | | | | |
| | places_d_shaped_end_work_surface | PLC | | | | | | |
| | places_teardrop_end_work_surface | PLC | | $D$214 | | | | |
| Countertops | | | | $E$267 | | | | |
| Straight Countertops | | | | | 1 | Mounts on top of in-line panel run of uniform (<=53") height longer than the width of the counter top | | |
| | premise_rectangular_counter_top | PRM | | | 1 | Must be installed over two solid panels: 1) 48" counter over two 24" wide panels, 2) 60" counter over two 36" wide panels | | |
| | places_rectangular_counter_top | PLC | | | | | | |
| | places_wheelchair_reception_counter_top | PLC | | $E$267 | | | | |
| Corner Countertops | | | | | 1 | "CC plc-cct" | | |
| | places_corner_counter_top | PLC | | $D$214 | | | | |
| Horizontal Accessories | | | | | | | | |
| | premise_keyboard_holders | PRM | | | | | | |
| | premise_mouse_pad | PRM | | | | | | |
| | premise_palm_rest | PRM | | | | | | |
| | places_corner_canopy | PLC | | | | | | |
| | places_electronic_transition_cover | PLC | | | 1 | "HA plc-cc" | | |
| | places_keyboard_holders | PLC | | | | | | |
| | places_make_a_corner | PLC | | | 1 | Requires 2 perpendicular panels - comes in at 45 degrees | 1 | Find corner closest to clock_loc, y_rot = avg of 2 corner pieces rotations, x/z_pos so as to position make_a_corner between them |
| | places_mouse_pad | PLC | | $D$214 | | | | |
| | places_palm_rest | PLC | | $C$156 | | | | |
| Table Tops | | | | | | | | |
| Vertical Supports | | | | | | | | |

-continued

Relationship Maps

| Class Structure | Component Name | Prod Line | Properties | Inherits From | C# | Constraint Relationships | L# | Light Weight Relationships |
|---|---|---|---|---|---|---|---|---|
| Covers | | | | | | | | |
| Finish Covers | premise_variable_height_cover | PRM | | SD$286 | | | | |
| | places_canopy_finish_post | PLC | | SE$287 | | | | |
| | places_electrical_end_cap | PLC | | | 1 | Height must match panel height | | |
| | places_end_of_run_post | PLC | | | 1 | Height/orientation should be appropriate ?? | | |
| | places_finish_post | PLC | | | 1 | Height must match difference in panel heights | | |
| | places_variable_end_of_run_post | PLC | | | | | | |
| Electrical Cover | new_views_base_cover_kit | PLC | | SE$287 | ??? | | ??? | |
| | places_180_connector_cover | PLC | | | | | | |
| | places_90_connector_cover | PLC | | | | | | |
| Connectors | | | | | | | | |
| T-Mount Kit | new_views_t_mount_bracket | PLC | | SD$286 | 1 | Must sit on floor | | |
| | | | | SE$299 | 1 | Cannot position the T-mount within .82" from end of panel | | |
| Standard Connectors | premise_connector | PRM | | SE$299 | Inh | | Inh | |
| | places_hinge | PLC | | | 1 | Must be as tall as the tallest panel being joined | | |
| Modesty Panel Supports | | | | SD$286 | | | | |
| | places_modesty_to_cabinet_bracket | PLC | | | | | | |
| | places_modesty_to_panel_bracket | PLC | | | n/a | NOT IN PHASE I | n/a | NOT IN PHASE I |
| Posts | | | | SD$286 | | | | |
| Upper Posts | | | | SE$308 | | | | |
| Lower Posts | | | | SE$308 | | | | |
| Architectural Connections | | | | SD$286 | | | | |
| Horizontal Supports | | | | SC$156 | | | | |
| Table Base | | | | SD$312 | 1 | Must sit on floor | | |
| Brackets | | | | SD$312 | | | | |
| Panel Attached Brackets | premise_pedestal_to_panel_bracket | PRM | AF (when used in pairs) | SE$314 | | | | |
| | premise_work_surface_cantilever | PRM | AF | | 1 | Unable to support 30" deep work surface with only cantilevers | n/a | |
| | premise_work_surface_corner_bracket | PRM | AF | | 1 | The long side of the bracket must align to a Panel (i.e. bracket must "clipo" to a panel) | n/a | |
| | places_included_work_surface_cantilever | PLC | | | n/a | | | |
| | places_work_surface_cantilever | PLC | | | | | | |
| | places_work_surface_corner_bracket | PLC | | | | | | |
| | places_work_surface_panel_mount | PLC | | | | | | |
| | places_work_surface_side_mount | PLC | | | n/a | NOT IN PHASE I required when cantilever in the way - use in place: provides aft support, credenza provides fore support | n/a | NOT IN PHASE I |
| | places_work_surface_slope_mount | PLC | | | | | | |
| | series_950_credenza_file_work_surface_support | PLC | | | | | | |

-continued

| Class Structure | Component Name | Prod Line | Properties | Inherits From | C# | Constraint Relationships | L# | Light Weight Relationships |
|---|---|---|---|---|---|---|---|---|
| Non-Panel Attached Brackets | | | | $E$314 | | | | |
| | premise_work_surface_drop_mount | PRM | | | | | | |
| | premise_work_surface_flush_mount | PRM | | | | Dep (brought in when NV Upper Cabinet touches a WS) | | n/a |
| | new_views_cabinet_to_work_surface_bracket | PLC | | | | | | |
| | places_work_surface_drop_mount | PLC | | | | | | |
| | places_work_surface_flush_mount | PLC | | | | | | |
| Legs | | | | | | | | |
| | premise_work_surface_support_leg | PRM | | | | | | |
| | places_work_surface_support_leg | PLC | AF, Acts as Return | $D$312 | 1 | Must sit on floor | | |
| Worksurface Support Panels | | | | | | | | |
| | premise_work_surface_support_panel | PRM | | $D$312 | | | | |
| | places_conference_end_support | PLC | | | | | | |
| | places_work_surface_end_full_support_panel | PLC | | | | | | |
| | places_work_surface_end_half_support_panel | PLC | | | | | | |
| | places_work_surface_support_panel | PLC | | | | | | |
| Height Adjustment Kits | | | | | | | | |
| | premise_lateral_file_height_adjustment_kit | PRM | | $D$312 | | | | |
| | premise_pedestal_height_adjustment_kit | PRM | | | | | | |
| | premise_storage_unit_height_adjustment_kit | PRM | | $D$312 | | | | |
| Adjustable Supports | | | | | | | | |
| | places_height_adjustable_corner_mechanism | PLC | | | | | | |
| | places_height_adjustable_rectangular_mechanism | PLC | | | | | | |
| | laces_height_adjustable_split_corner_mechanism | PLC | | | | | | |
| Seating | | | | $A$3 | | | | |
| Auditorium Seating | | | | $B$349 | | | | |
| Adjustable Seating | | | | $B$349 | 1 | Must sit on floor | | |
| | accolade_caster_base_chair | PLC | | | | | | |
| | accolade_caster_base_stool | PLC | | | | | | |
| | improv_caster_base_chair | PLC | | | | | | |
| | improv_he_caster_base_chair | PLC | | $B$349 | | | | |
| Stackable Seating | | | | | | | | |
| | improv_leg_base_stacking_chair | PLC | | $B$349 | | | | |
| Non-Adjustable Seating | | | | | | | | |
| | accolade_sled_base_chair | PLC | | | | | | |
| | improv_leg_base_stool | PLC | | | | | | |
| | improv_sled_base_chair | PLC | | | | | | |
| Loung Seating | | | | $B$349 | | | | |
| Benches | | | | $C$362 | | | | |
| Single Lounge Seating | | | | $C$362 | | | | |
| Multiple Lounge Seating | | | | #C#362 | | | | |
| Power and Data | | | | $A$3 | | | | |
| Power and Data Providers | | | | $B$366 | | | | |
| In-Feeds | | | | $C$367 | | | | |
| | premise_base_feed_module | PRM | | | | | | |
| | premise_top_feed_module | PRM | | | | | | |

-continued

| Class Structure | Component Name | Prod Line | Properties | Inherits From | C# | Constraint Relationships | L# | Light Weight Relationships |
|---|---|---|---|---|---|---|---|---|
| Out-Feeds | | | | | | | | |
| | places_base_feed_module | PLC | | | | | | |
| | places_top_feed_module | PLC | | | $C$367 | | | |
| | premise_base_igr_receptacle | PRM | | | 1 | Require 1 of the 4 receptacle ports on each panel | 1 | Snaps to receptacle port matching front/back and left/right, orientation same if front, 180 out if back |
| | premise_base_receptacle | PRM | | | | | | |
| | premise_panel_communications_port_kit | PRM | | | | | | |
| | premise_panel_power_port_kit | PRM | | | 1 | "OF prm-ppppk" requires Container (Raceway_Outlet), collocated and available | 1 | Snaps to Raceway_Outlet matching front/back and left/right, orientation same if front, 180 out if back |
| | places_base_igr_receptacle | PLC | | | | | | |
| | places_base_igr_surge_protecter_receptacle | PLC | | | n/a | NOT IN PHASE I | n/a | NOT IN PHASE I |
| | places_base_receptacle | PLC | | | n/a | NOT IN PHASE I | n/a | NOT IN PHASE I |
| | places_smart_work_surface_power_module | PLC | | | n/a | NOT IN PHASE I | n/a | NOT IN PHASE I |
| | places_switching_system_kit | PLC | | | n/a | NOT IN PHASE I | n/a | NOT IN PHASE I |
| | places_switching_system_power_supply | PLC | | | 1 | Requires a WS to sit on | 1 | Goes on top of WS at click_x, click_z |
| | places_switching_system_receptacle | PLC | | | | | | |
| | places_switching_system_wall_switch | PLC | | | | | | |
| | places_work_surface_duplex_receptacle | PLC | | | | | | |
| | places_work_surface_power_module | PLC | | | $B$366 | | | |
| Power and Data Routers | | | | $C$388 | | | | |
| Power and Data Channels | | | | | | | | |
| | premise_vertical_wire_manager | PRM | | | n/a | ACCESSORY | n/a | ACCESSORY |
| | places_cable_management_post | PLC | | | | | | |
| | places_horizontal_wire_manager_33in | PLC | | | n/a | ACCESSORY | n/a | ACCESSORY |
| | places_horizontal_wire_manager_40in | PLC | | | n/a | ACCESSORY | n/a | ACCESSORY |
| | places_variable_height_cable_management_post | PLC | | $C$388 | | | | |
| Power and Data Connectors | | | | | | | | |
| | premise_extended_power_connector | PRM | | | 1 | Consume 1 left- and 1 right-hand power site (used to span non-powered panels) | | |
| | premise_flexible_power_connector | PRM | | | 1 | Consume 1 left- and 1 right-hand power site | | |
| | premise_straight_span_power_connector | PRM | | | 1 | | | |
| | places_base_to_beltline_power_connector | PLC | | | | | | |
| | places_beltline_to_beltline_power_connector | PLC | | | | | | |
| | places_extended_power_connector | PLC | | | | | | |
| | places_flexible_power_connector | PLC | | | | | | |
| | places_straight_power_connector | PLC | | | $B$366 | | | |
| Cable Management | | | | | | | | |
| | premise_grommet | PRM | | | | | | |
| | premise_wire_management_loop | PRM | | | n/a | ACCESSORY | n/a | ACCESSORY |
| | places_cable_management_beltline_cover_plate | PLC | | | | | | |
| | places_cable_management_ported_cover_plate | PLC | | | | | | |
| | places_cable_management_top_cap | PLC | | | | | | |
| | places_grommet | PLC | | | | | | |
| | places_wire_basket | PLC | | | n/a | ACCESSORY | n/a | ACCESSORY |
| | places_wire_management_loop | PLC | | | n/a | ACCESSORY | n/a | ACCESSORY |
| | places_wire_managment_module | PLC | | | n/a | ACCESSORY | n/a | ACCESSORY |

-continued

| Class Structure | Component Name | Prod Line | Properties | Inherits From | Relationship Maps C# | Constraint Relationships | L# | Light Weight Relationships |
|---|---|---|---|---|---|---|---|---|
| Lighting | | | | | | | | |
| Horizontally Mounted Lighting | places_wire_manager | PLC | | | n/a | ACCESSORY | n/a | ACCESSORY |
| | places_work_surface_power_module_storage | PLC | | $B$366 | 1 | Mounts underneath WS | 1 | Sits.underneath_WS_at.click_x, clock_z |
| | premise_task_light | PRM | | $C$416 | 1 | Requires receptacle within 72 linear inches from the left or right back corner (on the supporting or either adjacent panel) | | |
| | premise_vertical_storage_task_light_bracket | PRM | | | 1 | "HML prm-tl" | | |
| | places_canopy_light | PLC | | | ??? | Attaches below places_canopy | | |
| | places_counter_top_task_light | PLC | | | 1 | "HML plc-cttl" | | |
| | places_freestanding_pivot_head_task_light | PLC | | | 1 | Requires flat surface to sit on | | |
| | places_task_light | PLC | | | 1 | "HML plc-tl" | | |
| Vertically Mounted Lighting | places_grid_hung_pivot_head_task_light | PLC | | $C$416 | n/a | ACCESSORY | | ACCESSORY |
| | places_panel_hung_fluorescent_light | PLC | | | 1 | "Hang Stuff" | | |
| | places_panel_hung_pivot_head_task_light | PLC | | | 1 | "Hang Stuff" | | |
| | places_panel_mounted_fluorescent_light | PLC | | | 1 | "VML plc-prmfl" | | |
| | places_post_mount_street_light | PLC | | | 1 | Mounts powered panels >= 18" wide, <63" tall | | |
| | places_steel_light | PLC | | $C$416 | 1 | "Mounts on Top of Panel" AND Panel >= 63" | 1 | If nothing selected, put an x_pos = click_global_x, y_pos = 0, z_pos = click_global_z, y_rot = 0 |
| Floor Mounted Lighting | | | | | 1 | Must sit on floor | | |
| Lighting Accessories | places_fluorescent_light_saddle_mount_kit | PLC | | | 1 | Requires appropriate top-cap (wood or metal) (instantiated by premise_shelf) | ??? | * |
| | places_painted_shelf_task_light_bracket | PLC | | | * | | | |
| | places_vertical_storage_task_light_bracket | PLC | | | ??? | | ??? | |
| | places_wood_shelf_task_light_bracket | PLC | | $A$3 | * | (instantiated by premise_shelf) | * | |
| Organization | | | | | | | | |
| Tackable Surfaces | premise_tackboard | PRM | N | $B$437 | 1 | "Tackables" | 1 | "Hang Stuff" |
| | places_grid_tackstrip | PLC | N | | Inh | | Inh | |
| | places_tackboard | PLC | N | | n/a | ACCESSORY | n/a | ACCESSORY |
| Markable Surfaces | premise_markerboard | PRM | N | $B$437 | 1 | "Markables" | 1 | "Hang Stuff" |
| | places_markerboard | PLC | N | | Inh | | Inh | |
| Workflow Devices | | | | $B$437 | | | | |
| Vertical Workflows | premise_all_purpose_hook | PRM | | $C$445 | n/a | ACCESSORY | n/a | ACCESSORY |
| | premise_lateral_file_drawer_compressor | PRM | | | n/a | ACCESSORY | n/a | ACCESSORY |
| | premise_lateral_file_drawer_divider | PRM | | | n/a | ACCESSORY | n/a | ACCESSORY |
| | premise_lateral_file_front_to_back_hanging_bar | PRM | | | n/a | ACCESSORY | n/a | ACCESSORY |
| | premise_lateral_file_side_to_side_hanging_bar | PRM | | | n/a | ACCESSORY | n/a | ACCESSORY |
| | premise_pedestal_drawer_divider | PRM | | | n/a | ACCESSORY | n/a | ACCESSORY |
| | premise_shelf_divider | PRM | | | n/a | ACCESSORY | n/a | ACCESSORY |
| | paper_management_bar | PLC, PRM | | | n/a | ACCESSORY | n/a | ACCESSORY |

-continued

Relationship Maps

| Class Structure | Component Name | Prod Line | Properties | Inherits From | C# | Constraint Relationships | L# | Light Weight Relationships |
|---|---|---|---|---|---|---|---|---|
| | paper_management_freestanding_vertical_unit | PLC, PRM | | | n/a | ACCESSORY | n/a | ACCESSORY |
| | paper_management_suspended_vertical_unit | PLC, PRM | | | n/a | ACCESSORY | n/a | ACCESSORY |
| | new_views_shelf_divider | PLC | | | n/a | ACCESSORY | n/a | ACCESSORY |
| | places_all_purpose_hook | PLC | | | n/a | ACCESSORY | n/a | ACCESSORY |
| | places_fundamental$_{13}$_pedestal_hanging_bar | PLC | | | n/a | ACCESSORY | n/a | ACCESSORY |
| | places_fundamental_pedestal_side_to_side_divider | PLC | | | n/a | ACCESSORY | n/a | ACCESSORY |
| | places_lateral_file_front_to_back_hanging_bar | PLC | | | n/a | ACCESSORY | n/a | ACCESSORY |
| | places_organization_grid | PLC | | | n/a | ACCESSORY | n/a | ACCESSORY |
| | places_shelf_divider | PLC | | | n/a | ACCESSORY | n/a | ACCESSORY |
| | places_vertical_storage_unit_grid | PLC | | | n/a | ACCESSORY | n/a | ACCESSORY |
| | tri_mode_paper_management_bar | PLC | | | n/a | ACCESSORY | n/a | ACCESSORY |
| | tri_mode_vertical_unit | PLC | | | n/a | ACCESSORY | n/a | ACCESSORY |
| | series_950_drawer_compressor | PLC | | | n/a | ACCESSORY | n/a | ACCESSORY |
| | series_950_drawer_divider | PLC | | | n/a | ACCESSORY | n/a | ACCESSORY |
| | series_950_front_to_back_handing_bar | PLC | | | n/a | ACCESSORY | n/a | ACCESSORY |
| | series_950_side_to_side_hanging_bar | PLC | | | n/a | ACCESSORY | n/a | ACCESSORY |
| Horizontal Workflows | | | | | | | | |
| | premise_pedestal_pencil_tray | PRM | | $C$445 | n/a | ACCESSORY | n/a | ACCESSORY |
| | paper_management_freestanding_horizontal_unit | PLC, PRM | | | n/a | ACCESSORY | n/a | ACCESSORY |
| | paper_management_suspended_horizontal_unit | PLC, PRM | | | n/a | ACCESSORY | n/a | ACCESSORY |
| | paper_management_trays | PLC, PRM | | | n/a | ACCESSORY | n/a | ACCESSORY |
| | paper_management_under_shelf_unit | PLC | | | n/a | ACCESSORY | n/a | ACCESSORY |
| | places_freestanding_grid_mailbox | PLC | | | n/a | ACCESSORY | n/a | ACCESSORY |
| | places_fundamental_pedestal_tray | PLC | | | n/a | ACCESSORY | n/a | ACCESSORY |
| | places_grid_mailbox | PLC | | | n/a | ACCESSORY | n/a | ACCESSORY |
| | places_grid_reference_tray | PLC | | | n/a | ACCESSORY | n/a | ACCESSORY |
| | tri_mode_divider | PLC | | | n/a | ACCESSORY | n/a | ACCESSORY |
| | tri_mode_hanger_clip | PLC | | | n/a | ACCESSORY | n/a | ACCESSORY |
| | tri_mode_horizontal_shelves | PLC | | | n/a | ACCESSORY | n/a | ACCESSORY |
| | tri_mode_horizontal_unit | PLC | | | n/a | ACCESSORY | n/a | ACCESSORY |
| Diagonal Workflows | | | | | | | | |
| | paper_management_freestanding_diagonal_unit | PLC, PRM | | $C$445 | n/a | ACCESSORY | n/a | ACCESSORY |
| | paper_management_suspended_diagonal_unit | PLC, PRM | | | n/a | ACCESSORY | n/a | ACCESSORY |
| | tri_mode_diagonal_unit | PLC | | | n/a | ACCESSORY | n/a | ACCESSORY |
| Workflow Bins | | | | | | | | |
| | places_grid_diskette_bin | PLC | | $C$445 | n/a | ACCESSORY | n/a | ACCESSORY |
| | places_grid_storage_bin | PLC | | | n/a | ACCESSORY | n/a | ACCESSORY |

Although described with reference to a particular system, the present invention operates on any computer system and can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

Thus, a graphical user interface for configuring office furniture is provided. One skilled in the art will appreciate that the present invention can be practiced by other than the described embodiments, which are presented for purposes of illustration and not limitation, and the present invention is limited only by the claims that follow.

What is claimed:

1. A method, for use in a user computer system including a pointing device and a visual display unit, for providing a graphical user interface to a computer program for configuring furniture, the method comprising:

displaying on a screen of the visual display unit at the user's computer system questions regarding user configuration criteria;

in response to said displaying, obtaining configuration criteria from the user and providing the user configuration criteria to the computer program;

displaying in an area on a screen of the visual display unit at the user's computer system a graphical representation of at least one typical furniture configuration satisfying the user configuration criteria, wherein a furniture configuration comprises a workstation having components;

selecting, with the pointing device, a typical furniture configuration from the at least one typical furniture configuration displayed on the screen;

modifying, using the pointing device, aspects of at least one of the components of the selected typical furniture configuration to produce a modified furniture configuration;

displaying on the visual display unit at the user's computer system a graphical representation of the modified furniture configuration;

with the pointing device, selecting a validity checking option to effect checking the validity of the modified furniture configuration; and in response to said selecting the validity checking option, checking the validity of the modified configuration.

2. A method as in claim 1 wherein the configuration criteria include at least one of:

conferencing criteria;
   privacy criteria;
   power criteria;
   communications criteria;
   storage criteria; and
   area criteria.

3. A method as in claim 1 wherein the modifying of the selected typical furniture configuration comprises at least one of:

adding another component to the depiction of the selected typical furniture configuration;
   deleting a depicted component from the depiction of selected typical furniture configuration;
   repositioning a depicted component of the depicted selected typical furniture configuration;
   changing the depicted fabric or finish of a depicted component of the depicted selected typical furniture configuration; and
   changing the shape or size of a depicted component of the depicted selected typical furniture configuration.

4. A method as in claim 3 wherein the adding of another component comprises:

on the screen of the visual display unit at the user's computer system, presenting the user with various possible components which can be added; and
   by the user,
      selecting with the pointing device one of the various possible components; and
      on the display depicting the typical furniture configuration,
      positioning the selected one possible component on the depiction of the current typical furniture configuration.

5. A method as in claim 3 wherein the changing the shape or size of the depicted component comprises, with the pointing device:

selecting the depicted component; and
   adjusting the shape or size of the depicted component, whereby the shape or size can only be adjusted to a valid shape or size.

6. A method as in claim 1 further comprising:

with the pointing device, selecting a price option to effect determining a price of the modified configuration; and
   in response to said selecting said price option, determining a price of the modified depicted configuration.

7. A method as in claim 1 further comprising:

with the pointing device, selecting a cluster option to effect producing a cluster configuration of the modified typical furniture configuration; and
   in response to said selecting said cluster option, producing a cluster configuration of the modified typical furniture configuration; and
   displaying on the screen of the visual display unit at the user's computer system a depiction of the cluster configuration.

8. A method as in claim 7 further comprising:

with the pointing device, selecting a price option to effect determining a price of the cluster configuration; and
   in response to said selecting said price option, determining the price of the cluster configuration.

9. A method as in claim 7 wherein the producing of a cluster comprises:

determining if the cluster configuration is a valid configuration; and
   optimizing the cluster configuration.

10. A method as in claim 1 wherein the checking the validity of the modified configuration comprises optimizing the modified configuration.

11. A method as in claims 9 or 10 wherein the optimizing of a configuration comprises at least one of:

removing redundant components from the configuration;
    merging components in the configuration; and
    splitting components in the configuration.

12. A method as in claim 1 wherein the modifying aspects of the selected typical furniture configuration comprises modifying the entire product line of the configuration.

13. A method of configuring furniture comprising, by computer:

obtaining configuration criteria from a user;
    presenting the user with at least one typical furniture configuration satisfying the criteria;
    selecting a typical furniture configuration from the at least one typical configuration, wherein a furniture configuration comprises a workstation having components;

modifying aspects of at least one of the components of the selected typical furniture configuration to produce a modified furniture configuration;

producing a cluster configuration of the modified typical furniture configuration;

checking the validity of the cluster configuration; and determining a price of the cluster configuration.

14. A method of configuring furniture comprising, by computer:

obtaining configuration criteria from a user;

presenting the user with at least one typical furniture configuration satisfying the criteria;

selecting a typical furniture configuration from the at least one typical configuration, wherein a furniture comprises a workstation having components;

modifying aspects of at least one of the components of the selected typical furniture configuration to produce a modified configuration; and checking the validity of the modified configuration.

15. A method as in claim 14 wherein the configuration criteria include at least one of:

conferencing criteria;

privacy criteria;

power criteria;

communications criteria;

storage criteria; and area criteria.

16. A method as in claim 14 wherein the modifying of the selected typical comprises at least one of:

adding another component to the selected typical furniture configuration;

deleting a component from the selected typical furniture configuration;

repositioning a component of the selected typical furniture configuration;

changing the fabric or finish of a component of the selected typical furniture configuration; and changing the shape or size of a component of the selected typical furniture configuration.

17. A method as in claim 16 wherein the adding of another component comprises:

presenting the user with possible components which can be added; and by the user,
selecting one of the possible components; and
positioning the selected one possible component on the current typical furniture configuration.

18. A method as in claim 16 wherein the changing the shape or size of the component comprises:

selecting the component; and adjusting the shape or size of the component, whereby the shape or size can only be adjusted to a valid shape or size.

19. A method as in claim 14 further comprising:

determining a price of the modified furniture configuration.

20. A method as in claim 14 further comprising:

producing a cluster configuration of the modified typical furniture configuration.

21. A method as in claim 20 further comprising:

determining a price of the cluster configuration.

22. A method as in claim 20 wherein the producing of a cluster comprises:

determining if the cluster configuration is a valid configuration;

optimizing the cluster configuration.

23. A method as in claim 14 wherein the checking the validity of the modified furniture configuration comprises optimizing the modified furniture configuration.

24. A method as in any one of claims 22 and 23 wherein the optimizing of a configuration comprises at least one of:

removing redundant components from the configuration;

merging components in the configuration; and splitting components in the configuration.

25. A method as in claim 14 wherein the modifying aspects of the selected typical comprises modifying the entire product line of the configuration.

26. Computer-readable media tangibly embodying an interface program of instructions executable by the machine to provide a graphical user interface to a computer program for configuring furniture, the interface program comprising code to effect:

displaying on a screen of a visual display unit at a user's computer system questions regarding user configuration criteria;

in response to said displaying, obtaining configuration criteria from the user;

displaying in an area on a screen of the visual display unit at the user's computer system a graphical representation of at least one typical furniture configuration satisfying the criteria, wherein a furniture configuration comprises a workstation having components;

selecting, with input from the pointing device, a typical furniture configuration from the at least one typical furniture configurations displayed on the screen;

modifying, using input from the pointing device, aspects of at least one of the components of the selected typical furniture configuration to produce a modified furniture configuration;

displaying on the visual display unit at the user's computer system a graphical representation of the modified furniture configuration;

with input from the pointing device, selecting a validity checking option to effect checking the validity of the modified furniture configuration; and in response to said selecting the validity checking option, checking the validity of the modified furniture configuration.

27. Media as in claim 26 wherein the configuration criteria include at least one of:

conferencing criteria;

privacy criteria;

power criteria;

communications criteria;

storage criteria; and area criteria.

28. Media as in claim 26 wherein the modifying of the selected typical comprises at least one of:

adding another component to the depiction of the selected typical furniture configuration;

deleting a depicted component from the depiction of selected typical furniture configuration;

repositioning a depicted component of the depicted selected typical furniture configuration;

changing the depicted fabric or finish of a depicted component of the depicted selected typical furniture configuration; and changing the shape or size of a depicted component of the depicted selected typical furniture configuration.

29. Media as in claim 28 wherein the adding of another component comprises:
   on the screen of the visual display unit at the user's computer system, presenting the user with various possible components which can be added; and
   by the user,
      selecting with the pointing device one of the various possible components; and
      on the display depicting the typical furniture configuration,
         positioning the selected one possible component on the depiction of the current typical furniture configuration.

30. Media as in claim 28 wherein the changing the shape or size of the depicted component comprises, with input from the pointing device:
   selecting the depicted component; and
   adjusting the shape or size of the depicted component, whereby the shape or size can only be adjusted to a valid shape or size.

31. Media as in claim 26 the program further comprising code to effect:
   with input from the pointing device, selecting a price option to effect determining a price of the modified configuration; and
   in response to said selecting said price option, determining a price of the modified depicted configuration.

32. Media as in claim 26 the program further comprising code to effect:
   with input from the pointing device, selecting a cluster option to effect producing a cluster configuration of the modified typical furniture configuration;
   in response to said selecting said cluster option, producing a cluster configuration of the modified typical furniture configuration; and
   displaying on the screen of the visual display unit at the user's computer system a depiction of the cluster configuration.

33. Media as in claim 32, the program further comprising code to effect:
   with input from the pointing device, selecting a price option to effect determining a price of the modified configuration; and
   in response to said selecting said price option, determining the price of the cluster configuration.

34. Media as in claim 32 wherein the producing of a cluster comprises:
   determining if the cluster configuration is a valid furniture configuration; and
   optimizing the cluster configuration.

35. Media as in claim 26 wherein the checking the validity of the modified configuration comprises
   optimizing the modified configuration.

36. Media as in claim 35 wherein the optimizing of a configuration comprises at least one of:
   removing redundant components from the configuration;
   merging components in the configuration; and
   splitting components in the configuration.

37. Media as in claim 34 wherein the optimizing of a configuration comprises at least one of:
   removing redundant components from the configuration;
   merging components in the configuration; and
   splitting components in the configuration.

38. Media as in claim 26 wherein the modifying aspects of the selected typical comprises modifying the entire product line of the configuration.

39. Computer-readable media as in any one of claims 26 to 38 wherein said media comprise at least one of a RAM, a ROM, a disk, an ASIC and a PROM.

40. A computer-assisted furniture configuration system comprising:
   (A) a visual display unit;
   (B) a pointing device; and
   (C) interface means for providing a graphical user interface to said configuration system, the interface means comprising means to effect:
   displaying on a screen of the visual display unit at the user's computer system questions regarding user configuration criteria;
   in response to said displaying, obtaining configuration criteria from the user and providing the user configuration criteria to the computer program;
   displaying in an area on a screen of the visual display unit at the user's computer system a graphical representation of at least one typical furniture configuration satisfying the user configuration criteria, wherein a furniture configuration comprises a workstation having components;
   selecting, with the pointing device, a typical furniture configuration from the at least one typical furniture configurations displayed on the screen;
   modifying, using the pointing device, aspects of at least one of the components of the selected typical furniture configuration to produce a modified furniture configuration;
   displaying on the visual display unit at the user's computer system a graphical representation of the modified furniture configuration;
   with the pointing device, selecting a validity checking option to effect checking the validity of the modified furniture configuration; and
   in response to said selecting the validity checking option, checking the validity of the modified configuration.

41. A computer-assisted furniture configuration system as in claim 40 wherein the interface means further comprises means to effect:
   (a) with the pointing device, selecting a cluster option to effect producing a cluster configuration of the modified typical furniture configuration;
   (b) in response to said selecting said cluster option, producing a cluster configuration of the modified typical furniture configuration; and
   (c) displaying on the screen of the visual display unit at the user's workstation a depiction of the cluster configuration.

* * * * *